US012542024B2

(12) United States Patent
Russ et al.

(10) Patent No.: US 12,542,024 B2
(45) Date of Patent: Feb. 3, 2026

(54) SYSTEM AND METHODS OF PROVIDING A LESS INTERRUPTIVE GAME EXPERIENCE IN A CASINO ENVIRONMENT

(71) Applicant: IGT, Las Vegas, NV (US)

(72) Inventors: Michael Russ, Graz (AT); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 217 days.

(21) Appl. No.: 18/206,893

(22) Filed: Jun. 7, 2023

(65) Prior Publication Data

US 2024/0412585 A1 Dec. 12, 2024

(51) Int. Cl.
*G07F 17/32* (2006.01)

(52) U.S. Cl.
CPC ...... *G07F 17/3211* (2013.01); *G07F 17/3223* (2013.01); *G07F 17/3227* (2013.01); *G07F 17/323* (2013.01)

(58) Field of Classification Search
None
See application file for complete search history.

(56) References Cited

U.S. PATENT DOCUMENTS 8,795,065 B2 8/2014 Walker et al.
9,558,619 B2 * 1/2017 Froy .................... A63F 13/327
10,621,824 B2 4/2020 Petersen et al.
2022/0207959 A1 * 6/2022 Schwartz ............ G07F 17/3239
2022/0215719 A1 * 7/2022 Schwartz ............ G07F 17/3239

OTHER PUBLICATIONS

"Use Focus on your iPhone or iPad," Apple Inc., as of Nov. 22, 2022, 4 pages [retrieved online from: web.archive.org/web/20221122022519/https://support.apple.com/en-us/HT212608].

* cited by examiner

*Primary Examiner* — Ronald Laneau
(74) *Attorney, Agent, or Firm* — Sheridan Ross P.C.

(57) ABSTRACT

In certain embodiments, the present disclosure relates to a gaming system that determines states of a gaming system and/or communication device of a player and uses the determined state to suppress received communications; during a gaming session between the player and gaming system to avoid interrupting the player.

20 Claims, 10 Drawing Sheets

SYSTEM AND METHODS OF PROVIDING A LESS INTERRUPTIVE GAME EXPERIENCE IN A CASINO ENVIRONMENT

BACKGROUND

The present disclosure is related to gaming systems and devices and, in particular, the use of such devices in connection with player communication devices.

In a typical casino, a player can play a variety of games of chance and/or skill on various types of electronic gaming machines ("EGM"). Most games have mathematically determined odds that ensure that the house has an advantage over the players. This advantage is called the house edge. Payout is the percentage of funds ("winnings") returned to players. In games such as poker where players play against each other, the house takes a commission called the rake.

At the core of any EGM is a random number generator. When a button or touch screen is activated, the computer accesses the numbers generated at that point in time and converts them to a display on the screen. The numbers correspond to a position on a "reel map"—the number and order of symbols on each virtual reel—and a "pay table"—the prizes awarded for each combination of symbols appearing on a line.

Gaming sessions on EGMs typically are independent of the player's communication device and vice versa.

BRIEF SUMMARY

In certain embodiments, the present disclosure relates to a gaming system that considers the state of the gaming system and/or player communication device to control player communication device and gaming system operations, respectively.

In some embodiments, a system includes a communication interface; a processor coupled with the communication interface; and a computer-readable storage medium coupled with the processor. The computer-readable storage medium stores instructions that enable the processor to determine a state of a gaming system; receive, during a gaming session between a player and the gaming system, a communication to be provided to the player; when the determined state of the gaming system is a first gaming system state, provide the received communication to the player during the gaming session; and when the determined state of the gaming system is a second gaming system state different from the first gaming system state, delay providing the received communication to the player during the gaming session until the state of the gaming system is the first gaming system state.

In some embodiments, method includes the steps of determining a state of a gaming system; receiving, during a gaming session between a player and the gaming system, a communication to be provided to the player; when the determined state of the gaming system is a first gaming system state, providing the received communication to the player during the gaming session; and when the determined state of the gaming system is a second gaming system state different from the first gaming system state, delaying provision of the received communication to the player during the gaming session until the state of the gaming system is the first gaming system state.

In some embodiments, a system includes a communication interface; a processor coupled with the communication interface; and a computer-readable storage medium coupled with the processor. The computer-readable storage medium stores instructions that enable the processor to determine a state of a gaming system; determine a state of a communication device of a player; receive, during a gaming session between the player and the gaming system, a communication to be provided to the player; when the determined state of the gaming system is a first gaming system state and the determined state of the communication device is a first communication device state, provide the received communication to the player during the gaming session; and when the determined state of the gaming system is a second gaming system state different from the first gaming system state or the determined state of the communication device is a second communication device state different from the first communication device state, delay providing the received communication to the player during the gaming session until the determined state returns to a corresponding one of second gaming system state and second communication device state.

Additional features and advantages are described herein and will be apparent from the following Description and the figures.

DETAILED DESCRIPTION

Figure 1:
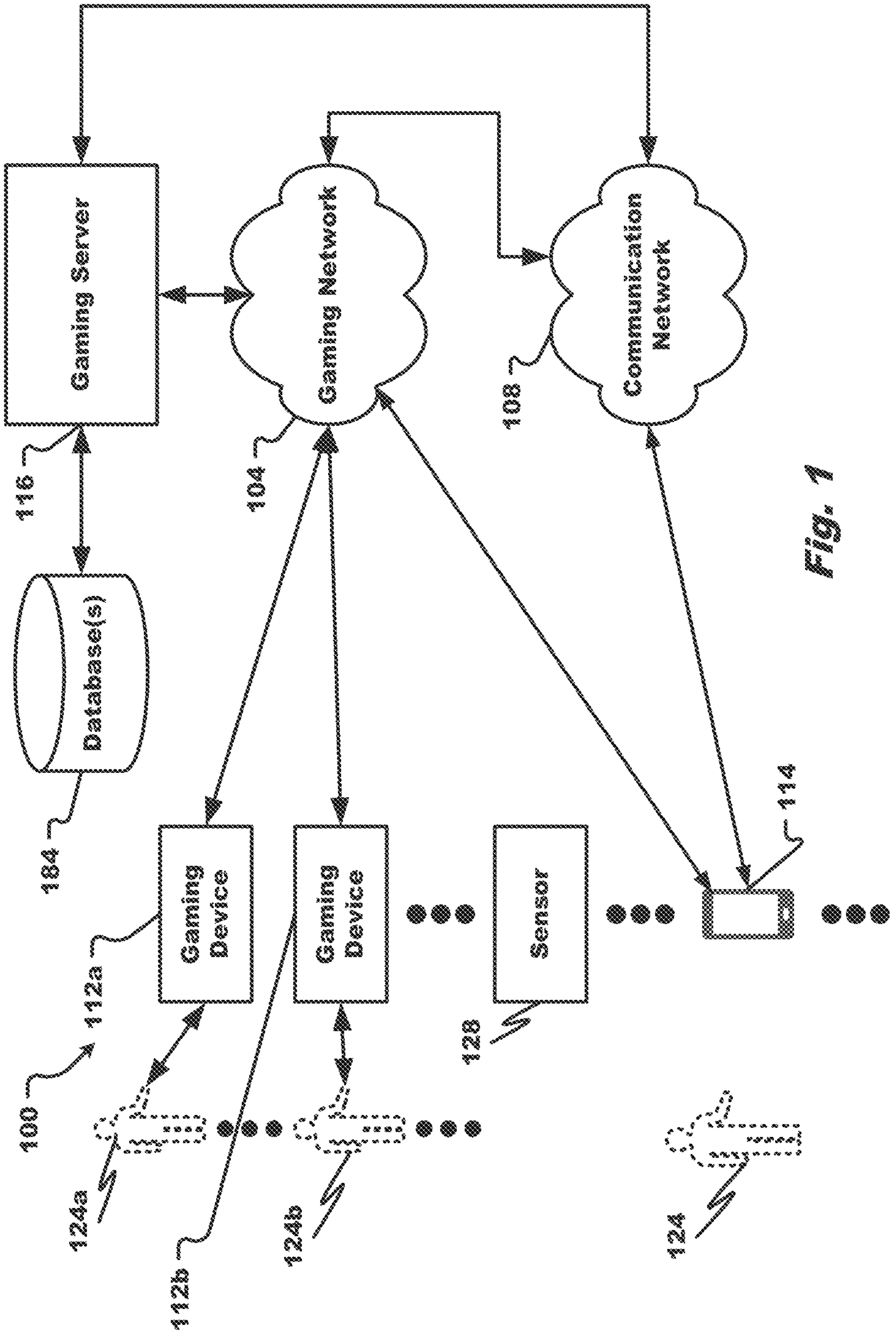
FIG. 1 is a block diagram of a gaming network in accordance with embodiments of the present disclosure.

Embodiments of the present disclosure will be described in connection with a gaming system that considers the state of the gaming system and/or player communication device to control player communication device and gaming system operations, respectively. For example, before or during a gaming session between a player and the gaming system, the gaming system or gaming device determines a state of a gaming system and a state of a communication device of a player. In response to receipt, by either the mobile device or the gaming system/device, of a communication to be provided to the player, a processor applies the following Do-Not-Disturb (DND) ruleset:

when the determined state of the gaming system is a first gaming system state and the determined state of the communication device is a first communication device state, the processor provides the received communication to the player during the gaming session; and when the determined state of the gaming system is a second gaming system state different from the first gaming system state or the determined state of the communication device is a second communication device state different from the first communication device state, the processor delays providing the received communication to the player during the gaming session until the determined state returns to a corresponding one of second gaming system state and second communication device state.

By way of illustration, the DND ruleset can be applied synchronously with in-game events in a gaming session between the gaming device and player. As long as selected in-game events occur within a selected relevance time interval (e.g., bonus spins, tension spin, reels spinning, reading the rules, and other in-game events), no communications received by the gaming device or mobile device are presented to the player (either on the gaming device or on mobile device). When the game or gaming session is over and/or the gaming device returns to "idle mode", communications cached during DND ruleset application are presented to the player by the gaming device and/or the mobile device.

While certain embodiments of the present disclosure will reference the use of gaming devices, such as an Electronic Gaming Machine (EGM), Electronic Gaming Table (EGT), virtual gaming machine, or video gaming gambling machine (VGM), as gaming devices, it should be appreciated that embodiments of the present disclosure can be used with any computer-controlled gaming device or collection of gaming devices or other devices controlled by a gaming server. Additionally, while certain embodiments of the present disclosure are discussed with reference to a mobile device, it is to be understood that any personal communication device of the player may be used with embodiments of the disclosure.

The received communication can be any type of message or other content to be provided by a user interface to the player. Examples include voice, text, video or multimedia communications addressed to the player's mobile device (e.g., phone calls, voice mails, emails, SMS or text messages, instant messages, chat, Instagrams, Tweets, social networking messages, and other electronic message types, modalities, and advertisements, notifications, announcements, pop-ups, news, and other informational content to be provided to the player by the gaming device.

The state of the gaming system can be any information regarding a gaming system or gaming device condition, configuration, activity or set of activities, condition regarding one or more stored inputs, or other state information. The state of the gaming system can be for the gaming system as a whole or for a component thereof, such as a gaming device (e.g., EGM). Accordingly, the gaming system state can refer to information describing a gaming session with a specific player, a plurality of gaming sessions with multiple players on different gaming devices, and a level of occupancy of gaming machines or spatial areas of the casino. The state of the gaming session, for instance, can include one or more of a characteristic of the gaming session with a selected player (e.g., speed of play, cash in amount, wager behavior, wagering speed, cash out amount, play session length, additional in-session cash in amounts, and idle time), occurrence of an in-game event during the gaming session, connection of a communication device (e.g., mobile device) of the player to the gaming system, and the like.

The state of the mobile device can be any information regarding a mobile device condition, configuration, activity or set of activities, condition regarding one or more stored inputs or other state information. Accordingly, the mobile device state can refer to information describing an interactive session by a user with a user interface or mobile device application.

By way of illustration, an EGM receives a communication to be presented to the player during a gaming session with the EGM. The EGM applies the ruleset and determines to cache the communication until the gaming session is concluded to avoid interrupting the player. Upon conclusion of the gaming session, the EGM can present the cached communications to the player.

In another illustration, a communication is received addressed to the player's mobile device. The mobile device is connected, wirelessly (e.g., WiFi or Bluetooth) or by a wired connection, to the EGM and notifies the EGM or the host gaming system that a communication has been received for presentation to the player. The EGM, in response to application of the DND ruleset to an active gaming session between the player and the EGM, requests the mobile device to cache the communication until the gaming session is concluded. The DND application can enable the user to set up permissions in the DND ruleset to adjust, suppress, enable-disable, mute, or forward communications being sent to the mobile device. The DND application could forward information to the gaming device when the mobile device is in a state of being used. In response, the gaming device could delay start of gameplay—or show a hover box on the gaming device display such as "game stopped as mobile device is being used". As will be appreciated, the state of the gaming system can be synchronized, via the connection and in real time, with the mobile device to enable a DND application on the mobile device itself to apply the ruleset without guidance from the gaming system. This configuration, in effect, makes the mobile device part (or a node) of the gaming system.

In another illustration, a communication is received by the EGM for presentation to the player. The EGM or gaming system is connected to the mobile device and notifies the DND application on the mobile device that a communication has been received for presentation to the player. The DND application on the mobile device, in response to application of the DND ruleset to active player engagement with a user interface of the mobile device, requests the EGM to cache the communication until the player is no longer actively engaged with the mobile device. As will be appreciated, the state of the mobile device can be synchronized with the EGM, via the connection and in real time, to enable the EGM itself to apply the ruleset without guidance from the mobile device.

Based on the determined state of the gaming system and/or mobile device, the DND logic, whether on the mobile device or gaming system/gaming device can select a set of presentation parameters for presentation of the communication to the player. The set of presentation parameters can include for example one or more of identification of a target display on a gaming device of the gaming system and/or the player's mobile device for providing the communication, a presentation frequency for presenting received communications to the player (e.g., a push frequency, presentation interval, or refresh rate of cached communications (e.g., display communications every 5, 10, 15, etc. minutes only), a display notification object type, size, and/or display location to notify the player of a number of received communications awaiting presentation to the player, and a time interval during which received communications awaiting presentation to the player are to be cached for later presentation to the player. As will be appreciated, other display parameters may be selected based on the state of the gaming system or mobile device.

The DND logic can, for example, cause communications to be presented based on the connection status between the mobile device and gaming system. The mobile device forwards any kind of communications through the DND application to either the gaming system network or the gaming device directly (depending on connection architecture). Based on the status and configuration of the DND logic, communications can be forwarded to the gaming device, and—if they are set as relevant—presented to the player on the gaming device's display instead of on the mobile device's display, some selected communications can be forwarded to the gaming device for presentation to the player whereas other communications remain on the mobile device for presentation to the player, the communications can be presented to the player on both the gaming and mobile devices, or no communications are pushed to either the gaming or mobile device.

The rulesets can be applied only during a previously activated DND mode or whenever a communication is received regardless of whether a DND mode is activated or deactivated. In the former case, the DND mode is activated or deactivated manually by the player or automatically to prompt the player for activation or deactivation without player input in response to one or more trigger events, such as cash-in, cash-out, bonus game, win, loss, or other in game event occurrence, player proximity presence detection to a selected gaming system component or location (e.g., as determined by a camera or other sensor), successful or attempted player authentication by the gaming system, current player behavior compared to historic precursor player behavior to DND mode manual activation, at predetermined times or during predetermined time intervals, while using a predetermined application on the mobile device or playing a certain type of game on the gaming device, etc. The player may be provided with a DND configuration menu to enable the player to set DND mode conditions (e.g., the menu being available on the gaming and/or mobile device). In the latter case, the ruleset is applied whenever the mobile device of the player is connected to the gaming system or device regardless of whether a DND mode is in effect.

The DND mode of the gaming system or gaming device and/or mobile device can be activated or deactivated manually or automatically by occurrence of one or more trigger events sensed by the gaming system or gaming device and/or mobile device. Examples of triggers include wireless or wired connection of the mobile device to the gaming system or gaming device (e.g., entry of pairing mode, plug in of wire to the mobile device or gaming device, scanning of QR code, etc.). user or player behavior or action (e.g., based on the previously observed player's habits), on the fly adjustment of specification and customization based on observed habit changes or on manual overwrites by the player, and observed player behavior in response to various external gaming events or situations or other sensed stimuli), clock settings, and user DND preferences.

The DND mode can be implemented as a series of pre-configured DND profiles in which the DND profile specifies DND triggers, DND rulesets, and the like. An applicable DND profile may be selected by the player from the library of DND profiles. In some applications, the DND profiles may be further configured or customized by the player.

In some aspects, the gaming system (network and/or server) can act as a router between the gaming device and the mobile device. When entering the gaming system (e.g., casino) premises (and/or connecting to the gaming system network and/or using geofencing techniques), pushing of news and other information is typically activated, and deactivated when leaving the gaming system premises. The player is typically notified about gaming system news and other information only when the player is in or near the gaming system premises to avoid annoying the player with gaming system information while the player is remote from the premises. The gaming system is aware not only of when the player is in or near the premises but also of when the player is playing at a gaming device and can avoid forwarding communications to the player's mobile device and gaming device during gaming sessions. The gaming system (network and/or server) are also aware (through information forwarding of the gaming device) which in-game event is happening. Based on the in-game event, the gaming system (network and/or server) can filter communications so as to push relevant communications based on what in-game event has just happened in the gaming session that may be of relevance to the player in that moment.

In some aspects, the mobile device is connected to the gaming device, and the gaming device receives communications directly from the mobile device. In this implementation, communications are not routed by the gaming server through the gaming network but rather by the gaming device to the gaming server.

In other aspects, the mobile device acts as the router directing communications from the gaming device to the gaming server.

A set of filtration rules (e.g., exception handling, whitelist, blacklist, etc.) can be used by the DND ruleset to determine whether to cache the received communication for delayed presentation to the player after the gaming session or provide the communication to the player during the gaming session. The set of filtration rules can be based on one or more of the following parameters: a source of the received communication (e.g., a person, electronic address or application), a type or modality of the received communication (e.g., email, SMS or instant messages, phone calls, Instagram, etc.), content of the received communication, in-game events (e.g., the filter rules used depend on occurrence of particular in game events, game type being played by the player), player gaming activities (e.g., the filter rules used depend on current player activities), and a priority or sensitivity of the received communication. The player, for example, can whitelist/blacklist certain communication applications (or communication modalities such as email, SMS, texts, Instagram, Twitter; email, phone, etc.), communication sources (e.g., people or devices), communication types, and other message header fields or payload content within the player's DND profile settings. The player can introduce a "DND soft mode" which allows prioritized contacts' communications to be presented to the player versus a "DND strict mode" in which no communications of any type are presented to the player.

The DND logic can provide a private DND node versus a gaming system information DND mode. The private DND mode prevents any private or sensitive notifications received by the mobile device or the gaming device from being pushed to the other device (such as calls, application notifications, text messages, social media notifications, and other types of communications or such communications comprising sensitivity or privacy tags or from specified sources and/or having predetermined types of content). For instance, non-gaming system related communications may be silenced or otherwise suppressed. The gaming system information DND mode prevents any communications being pushed from the gaming server (e.g., casino events, special offers, announcements, advertisements and the like). Thus, the DND mode would be able to differentiate between the communication type, and the mobile or gaming device may react differently, based on the DND logic customization.

To avoid transmitting malicious content between the gaming system and mobile device, the received communication can be scanned by the receiving one of the gaming system and mobile device for malicious content before exchanging the communication with the other of the mobile device and gaming system. When the received communication comprises malicious content, the communication is not only not exchanged with the other device but also prevented from being presented to the player.

When a communication is cached for later presentation to the player, the receiving device, whether the mobile device or gaming system/gaming device, can transmit a predetermined, auto-generated, responsive communication to the source of the received communication indicating delayed response by the player. The user, for example, could provide an automated text responses to communication senders (e.g., other people either calling and/or texting the user) such as "I am currently playing a hot bonus on Triple Wild 7 in the MGM Grand Casino; I will call you back later". This response could be sent to communication sources during the entire time that the player is on or near the gaming system premises or when the player is playing at a gaming device or when the player is involved in a predetermined game event of a gaming session. The option can be provided with themed message responses to the sources of suppressed or cached communications. The responses can include other information such as the name of the game that is being played by the player, the casino location, name of the bonus in the player's game, etc. The response can alternatively be neutral or generic.

The DND logic can generate and send communications to the player. After a selected in-game event, for example, the gaming system can present a message to the player (after expiration of a certain time threshold following occurrence of the in-game event) such as: "If you want, now would be a good time to check your mobile device communications". The time threshold could be based on psychological data (span of attention) or defined by the player or automatically generated based on the observation of the player's behavior using sensed input. Asking the player to look at his or her mobile device (even while the DND mode is activated) could be used strategically, e.g., after a longer losing streak, to make the player forget about the losing streak more easily.

In another application, the DND logic can generate and send an interrupt communication to the mobile device to attract the player's attention with respect to occurrence of an event in the game or gaming session. The communication for instance can take the form of: "You are now entering the bonus game; you should have a look at the gaming screen to proceed" This capability could be of particular interest while the player is playing on the gaming device in auto play mode.

To enable a gaming server of a hosted gaming device or mobile device connected to the gaming device or server to track gaming events or activities of concurrent gaming sessions, the gaming device can provide gaming information to the host gaming server or connected mobile device in electronic messages comprising the unique identifier of the gaming device, the unique identifier of the player associated with the gaming information or activity, and a description of the gaming information or activity. By way of illustration, the host server or mobile device receives, from the gaming device at a first time and through a network communications interface, a first electronic message comprising an identifier of the gaming device, a first identifier of the first player in a first gaming session, an identifier of the first gaming session, and a first description of a first gaming activity of the first player in the first gaming session; updates a first electronic record associated with the first gaming session to reflect the first gaming activity; receives, from the gaming device and through the network communications interface, a second electronic message comprising the gaming device identifier, the first identifier, the first gaming session identifier, and a second description of a second gaming activity of the first player in the identified first gaming session; updates a second electronic record associated with the second gaming session to reflect the second gaming activity; and at a conclusion of the first gaming session, receives a third electronic message comprising the gaming device identifier, the first player identifier, the first gaming session identifier, and a third description of a third gaming activity, the third description indicating an outcome of the first gaming session, such as an award to be transferred to the first player; and updates a third electronic record of the first player to reflect transfer of the award.

The DND mode can have varying display configurations on the mobile device. For example, the activated DND mode can change an appearance of the mobile phone display or other user interface parameters. The DND logic can cause the mobile device to display an entire screen overlay indicating that the mobile device is in DND mode. The display, for instance, can visually display a blacked out or themed screen with a notification that the DND mode is in effect with an option to deactivate the mode. The screen overlay for instance can indicate that "Phone usage is prohibited by DND mode. Deactivate DND mode to receive all notifications". The user interface can use a distinct audible announcement tone or ringtone or vibration pattern or volume or amplitude settings for such announcements or vibration to indicate that the DND mode is activated or deactivated.

The mobile device, during DND mode activation, can perform maintenance or update activities to further increase user convenience. For instance, the mobile device can perform automatic application or operating system updates: Since the mobile device is largely dormant or unused, activation of the DND mode can start updating the applications and the operating system.

While the various example embodiments of the present disclosure are discussed with reference to an EGM, it should be appreciated that the electronic gaming device can be not only other types of EGMs such as EGTs, virtual gaming machines, or VGMs but also with other electronic gaming devices such as kiosks and mobile devices.

While the various example embodiments of the present disclosure are discussed with reference to specific types of games, it is to be appreciated that the teachings of the present disclosure can be employed with any number of different types of electronic games and are therefore game type agnostic.

The DND feature can be implemented within a casino, via a gaming network, online, and/or via mobile or smartphone application.

By reducing player media disturbances, the feature can provide higher levels of player satisfaction and encourage higher levels of gameplay by enabling players to experience increased undistracted time on the gaming device, have greater focus on the game while playing, and have increased perception or satisfaction about the gaming experience during and after a casino visit. As will be appreciated, a player tends to lose focus about important game events going on, when busy with his or her mobile phone. Push notifications might continuously disrupt the player's gaming experience and wanted and unwanted push notifications cannot be differentiated from each other.

DND logic can be customizable, flexible, and, in real-time, and adaptable based on in-game events to address these issues. It can provide less interruptive game experiences to a player (e.g., while playing), thereby reducing overstimulation or information flood during a casino visit. Thus, it can help the player to focus on what he or she wants to focus on and disconnect from many other unwanted interruptions or notifications. To achieve that, a mobile application on the player's mobile device tailors which information shall be received, minimize unwanted pop-ups without requiring total muting of the device, and synchronize with in-game events or casino announcements. This ability enables the player to have his or her focus where the player's attention is required most.

The technical problem of securely implementing a DND-type feature to control different types of informational inputs on multiple devices during an associated player's gaming session can be accomplished by the technical solution of using distributed DND on the multiple devices to synchronize awareness of incoming communications to each device and player activities on each device to uniformly apply rules over the various devices that pass, block entirely, or selectively filter presentation of communications based on the player activities. The can be done by a direct connection to the gaming device by the mobile device and gaming server.

The technical problem of tracking separate player activities and associating game activities or events on different player communication and gaming devices can be solved by including in electronic messages exchanged by the mobile device with a host server or gaming device a unique player identifier known to the gaming system with a description or identifier of the mobile device state (e.g., indicating a type or intensity or nature of player interaction with a user interface of the mobile device) and by the host server or gaming device with the mobile device the unique player identifier known to the mobile device with a description or identifier of the gaming system state (e.g., indicating a gaming activity or event description). The state descriptions or identifiers are expressed using a common language, grammar, and vocabulary and can be mapped to a common look up table or other maser list or index on the receiving device that maps the state description or identifier to a corresponding set of DND actions.

The technical problem of how to manage higher priority communications during general DND suppression of communications can be solved using exceptions to DND suppression rules that permit higher priority communications to be presented on the receiving device or to select a target user interface on a selected device or type and size and display location on the target user interface of a presentation icon to notify the player of the higher priority communication without unnecessarily interrupting the player's gaming session.

The technical problem of how to avoid malware infestation or other malicious content transmission through exchange of communications between devices can be solved by parsing the communication or other exchanged signal followed by scanning the parsed communication using a database of known malware or malicious content descriptions (or signatures) that indicate what the malware or malicious content does and how to recognize it. Other techniques can be employed depending on the application. For example, malware or malicious content identification can be effected by heuristic analysis (which allows anti-malware programs to detect threats that were not previously discovered based on identified malware behaviors and characteristics), sandboxing (in which a program suspected to be malicious is executed in a sandbox, or a protected space on the computer, while the anti-malware program monitors the program's behavior and, if the program demonstrates malicious behavior, the anti-malware program will terminate it), among other techniques.

Machine-to-machine communications and player input can be improved using an interactive service window on a host gaming device such as the gaming server, the service window having an address on the gaming or communications network different from an address of the host gaming device itself, to exchange directly in bound and out bound electronic messages with the remote gaming server and display content provided by the gaming server to the player. The service window can slide into view either from the right, left, or top of the gaming display and offer interactive touch screen capabilities to the player. The content of the game theme on the display is unaffected or independent of the service window, which can be opened or closed by the player. The service window can be a fully interactive touch screen menu that players can use to activate bonus features, view messages or advertisements from the casino, play side games such as the incentivization feature, and manage a player account. The service window can enable the operator of the gaming system to present higher priority communications received by the mobile device during a gaming session to the player.

Referring now to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a network according to embodiments of the present disclosure may include one, some, or all of the components depicted in the system 100 and does not necessarily have to include all of the components. For instance, the components may be distributed amongst a plurality of servers and/or gaming devices (e.g., an EGM, etc.) without departing from the scope of the present disclosure. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 104 may correspond to a distributed set of devices that interconnect and facilitate machine-to-machine communications between one or multiple gaming devices 112*a, b*, . . . , each interacting with multiple players 124*a, b*, . . . , a mobile device 114 (also referred to herein as a communication device) interacting with a player 124, one or more sensors 128, and the gaming server 116.

The communication network 108 may correspond to a distributed set of devices that interconnect and facilitate machine-to-machine communications between the components of the gaming system 100 and external components including the mobile device 114. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112*a, b*, . . . are configured to communicate with the gaming server 116 using devices that are owned and administered by the same entity that administers security settings of the gaming devices 112*a, b*, . . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112*a, b*, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 308 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112*a, b*, . . . may be distributed throughout a single property or premises (e.g., a single casino floor) or the gaming devices 112*a, b*, . . . may be distributed among a plurality of different properties. In a situation where the gaming devices 112 *a, b*, . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 *a, b*, . . . may utilize the same or different types of communication protocols to connect with the gaming network 104. It should also be appreciated that the gaming devices 112 *a, b*, . . . may or may not present the same type or category of game to a player 124. It should be appreciated that a gaming device 112 *a, b*, . . . may correspond to one example of a gaming device. It should also be appreciated that the functions and features described in connection with a gaming device 112 *a, b*, . . . may be provided in any other type of gaming device without departing from the scope of the present disclosure.

In some embodiments, the gaming devices 112 *a, b*, . . . may be configured to communicate with a centralized management server in the form of the central gaming server 116. The central gaming server 116 may be configured to centrally manage games of chance, games of skill, or hybrid games of chance/skill played at the gaming devices 112 *a, b*, . . . (e.g., slot games), enable execution of a different game (e.g., a card game), monitor player 124 activity at the gaming devices 112 *a, b*, . . . , track player 124 association with a gaming device 112 (such as gaming events), facilitate communications with players 124 via the gaming devices 112 *a, b*, . . . , and/or perform any other task in connection with games played by a player 124 at gaming devices.

The sensors 128 may support example aspects described herein of acquiring sensor data associated with a gameplay session (also referred to herein as sensor devices). The sensors 128 may be implemented at (e.g., integrated in) any combination of gaming devices 112 and/or communication devices 114. In some aspects, the sensors 128 may be standalone devices capable of communicating with any component (e.g., a gaming device 112, a gaming system 100, a database, etc.) of the gaming system 100, for example, via the communication network 104.

In some aspects, the sensors 128 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 128 may be integrated within a physical interface of a gaming device 112 or a communication device 114. In some cases, the sensors 128 may be integrated at or within a threshold distance of a gaming device 112. For example, the sensors 128 may be integrated with a seat cushion, an arm rest, a seat back, a pull handle, a "spin" button, etc.

In some examples, the sensors 128 may capture or measure, as part of gameplay data, biometric data (e.g., facial features, facial response, eye movement, pupil dilation, heart rate, temperature, pulse, speech or speech patterns, breathing pattern, etc.) of a player with respect to a decision event, a gameplay decision, and/or a gameplay result in association with a gameplay session. The sensors 128 may detect changes and/or patterns in biometric data in association with a decision event, a gameplay decision, and/or a gameplay result in association with a gameplay session. In some aspects, the sensors 128 may include smart sensors capable of scanning and/or measuring a player's biometric parameters such as pulse, breathing rate, heart rate, eye focus, body movement, attention, electroencephalogram (EEG) parameters (e.g., electrical activity of the brain), electrocardiogram (ECG or EKG) parameters (e.g., heard rhythm and electrical activity), voice, speech pattern, etc.

In some other examples, the sensors 128 may capture or measure, as part of gameplay data, a value (e.g., force, velocity, etc.) corresponding to physical inputs (e.g., button presses, etc.) by the player at a gaming device 108 in association with a decision event, a gameplay decision, and/or a gameplay result in association with a gameplay session. For example, a sensor 128 at a gaming device 112 may be a pressure sensor integrated within a button (e.g., a "spin" button, a "bet" button, etc.) at the gaming device 112, and the sensor 128 may capture or measure a value indicating a force at which the player presses the button.

The sensor 128 output can be used to instantiate or activate a DND mode with respect to the player's engagement with a gaming device 112. For example, the sensor 128 output can sense a player attention span or other player behavior indicating a desire of the player to avoid interruptions during gaming device engagement. By way of illustration, the sensor output can indicate at least a threshold gameplay intensity by mapping one or more values of the sensor output against a lookup table or list or index of DND actions to determine that the gameplay intensity is sufficiently high that the player does not want to be disturbed.

In some other examples, the sensors 128 enable player tracking using a location-based tracking service in which an application or other software in the sensor uses global positioning service (GPS), radio frequency identifier (RFID), Wi-Fi or cellular data to trigger a pre-programmed DND action when a communication device 114 or RFID tag carried by the player enters or exits a virtual boundary set up around a geographical location. Entering or exiting the geographical location can prompt the DND logic to instantiate the DND mode for a gaming session with a most proximal gaming device to control presentation of communications, such as mobile push notifications, announcements, advertisements, text messages or alerts, etc.

It should be appreciated that the central gaming server 116 may or may not be co-located with the gaming devices 112. Thus, one or more gaming systems 112 may communicate with the gaming server 116 over a WAN, such as the Internet. In such an event, a tunneling protocol or Virtual Private Network may be established over some of the communication network 108 to ensure that communications between a gaming device 112 and a remotely-located gaming server 116 are secured.

FIG. 1 also depicts the possibility of some personal gaming mobile devices 114 (e.g., smart phones, tablet computers, etc.) being paired with a gaming device 112, thereby enabling communications to flow between the personal gaming mobile device on the one hand and the gaming device 112 on the other. This communication may utilize a proximity-based communication protocol, such as Bluetooth, BLE, NFC, WiFi, etc. One or more personal gaming devices of the player 124 may not necessarily be paired with a gaming device 112, but such personal gaming devices may still be configured to communicate with the central gaming server 116 via the communication network 108. Communications between the gaming device 112 and personal gaming mobile device may facilitate any number of combinations of gameplay opportunities.

The central gaming server 116 is in communication, via the gaming network 104, with one or more databases 184. The databases 184 may be configured to store one or multiple data structures (described below) that are used in connection with interactive gaming activities of players 124 and the gaming system 100. The databases can use any database model and compatible database management system. Examples of database models include relational databases, object-oriented databases, and non-relational databases, such as NoSQL and NewSQL databases.

Figure 2:
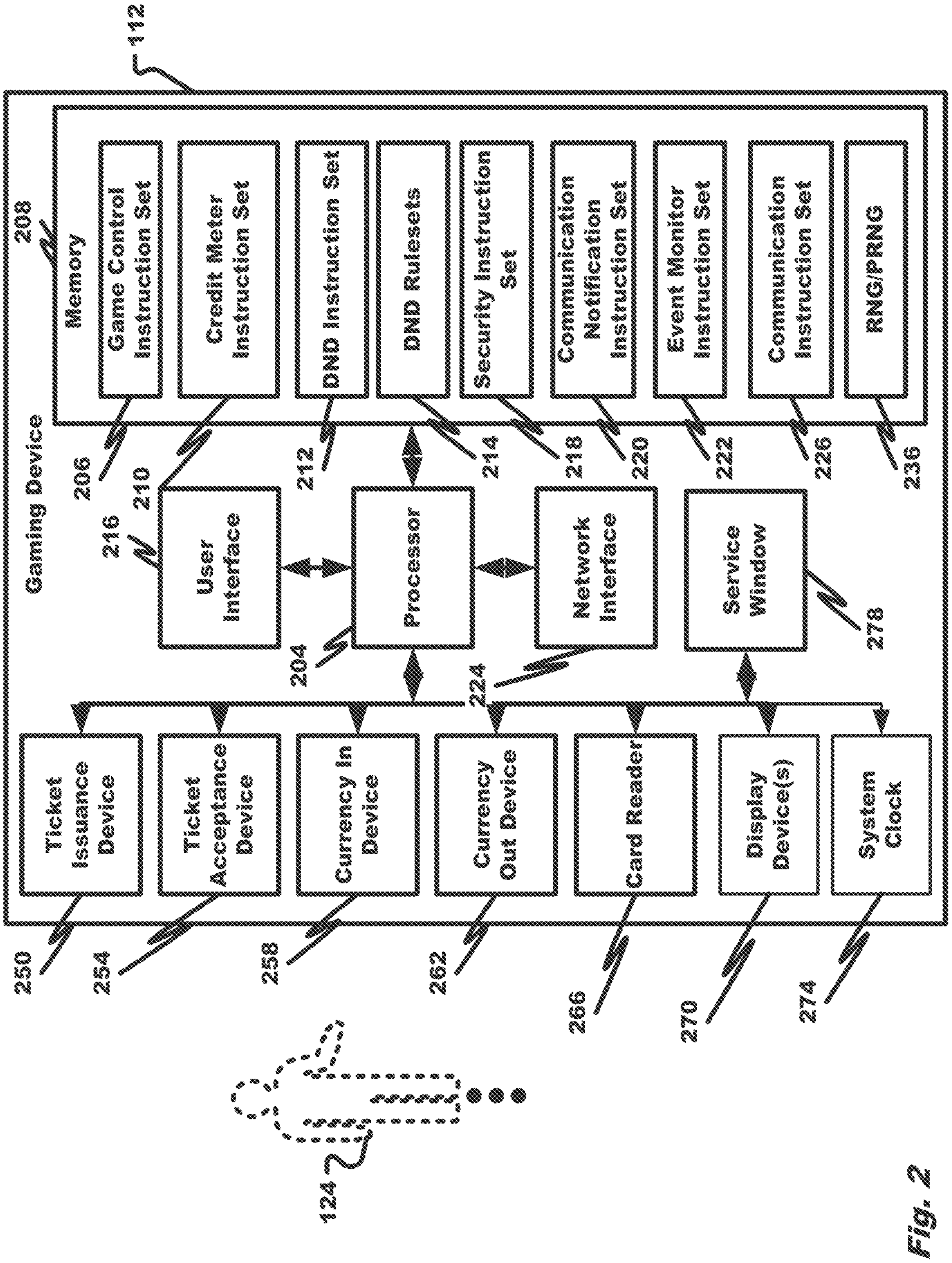
FIG. 2 is a block diagram depicting a gaming device in accordance with embodiments of the present disclosure.

With reference to FIG. 2, additional details of the components that may be included in a gaming device 112 will be described in accordance with at least some embodiments of the present disclosure.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, VLT, a mobile communication device (e.g., a smartphone, laptop, wearable device, etc.), a laptop, a PC, etc. The illustrative gaming device 112 depicted in FIGS. 1 and 2 may include a support structure, housing or cabinet, which provides support for a plurality of displays, inputs, controls and other features of a conventional gaming machine. In some embodiments, the player plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 312 can be constructed with varying cabinet and display configurations.

The gaming device 112 is shown to include a processor 204, memory 208, a network interface 224, and a user interface 216.

In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), or plurality of microprocessors that are configured to execute the instructions sets stored in memory 208. In some embodiments, the instruction sets stored in memory 208, when executed by the processor 204, may enable the gaming device 112 to provide game play functionality.

The nature of the network interface 224 may depend upon whether the network interface 224 is provided in cabinet- or player station-style gaming device 112 or a mobile gaming device 112. Examples of a suitable network interface 224 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 112 is connecting to a single gaming network 104 or multiple different types of gaming networks 104. For instance, the gaming device 112 may be provided with both a wired and wireless network interface 224 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling player 124 interaction with the gaming device 112. The user interface 216 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a game control instruction set 206, credit meter instruction set 210, DND instruction set 212, DND rulesets 214, security instruction set 218, communication notification instruction set 220, event monitor instruction set 222, communication instruction set 226, and random number generator or pseudorandom number generator (collectively referenced as PRNG/RNG) 236 that is used by the game control instruction set 406, for example, to provide game outputs.

In some embodiments, the game control instruction set 206, when executed by the processor 204, may enable the gaming device 112 to facilitate one or more games with the player(s) 124. In some embodiments, the game control instruction set 208 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 114 of other non-players or third parties, subroutines that create, maintain and update player profiles of the player(s) to the game, subroutines that generate, such as by PRNG/RNG 236, an outcome of the game, subroutines that alter, modify, or select game or display operations or functions in response to the gaming sessions, subroutines that calculate whether an outcome of the game has resulted in a win or loss during the game, subroutines for determining winnings and award payouts for the player(s) and others in the event of a win, subroutines for exchanging communications with another device, such as another gaming device 112 or gaming server 116, and any other subroutine useful in connection with facilitating game play at the gaming device 112.

The credit meter instruction set 210, when executed by the processor 204, may enable the gaming device 112 to facilitate a tracking of activity at the gaming system 100 for reporting to the gaming server 116. In some embodiments, the credit meter instruction set 210 may be used to store or log information related to various player 124 activities and events that occur at the gaming device 112. The types of information that may be maintained in the credit meter instruction set 210 include, without limitation, player information, available credit information, wager amount information, changes in wager credit meter balance as a function of time, and other types of information that may or may not need to be recorded for purposes of accounting for wagers placed at the gaming device 112 and payouts made for a player 124 during a game of chance or skill played at the gaming device 112. In some embodiments, the credit instruction set 210 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 112, and the like. In some embodiments, certain portions of the credit meter instruction set 210 may be updated in response to outcomes of a game of chance or skill played at the gaming device 112. In some embodiments, the gaming device 112 does not include a credit meter instruction set 210.

The DND instruction set 212, when executed by the processor 204, may enable the gaming device 112 to apply one or more DND rulesets 214 to determine the state of the gaming system 100 and/or mobile device 114, receive, during a gaming session between the player and the gaming system, a communication to be provided to the player, when the determined state of the gaming system is a first gaming system state and the determined state of the communication device is a first communication device state, provide the received communication to the player during the gaming session, and, when the determined state of the gaming system is a second gaming system state different from the first gaming system state or the determined state of the communication device is a second communication device state different from the first communication device state, delay providing the received communication to the player during the gaming session until the determined state returns to a corresponding one of second gaming system state and second communication device state.

The security instruction set 218, when executed by the processor 204, may enable the gaming device 112 to perform various security functions, including user/player authentication and malicious content scanning. In the former case, a person in possession of a mobile device may not be unauthorized to use it connection with accessing the gaming system on behalf of the authorized user. This can cause unauthorized access to the authorized user's gaming system account or profile through the DND logic. In the latter case, communications exchanged between the mobile device and gaming system can comprise malicious content, such as malware, ransom ware, trojan horses, computer codes or any software or hardware or other virus designed to disrupt or destroy any operations partially or wholly on a network or computer system.

A number of additional authentication techniques can be employed to confirm that the person in possession of the mobile device is authorized to possess the device. By way of example, security instruction set 218, when executed by the processor 204, may require the mobile phone user to scan a Quick Response or QR code or enter a Universal Resource Locator (URL), displayed on the gaming device's screen, to enable pairing of the mobile device to the gaming device. A mobile device application can scan the QR code from a gaming device display of the user interface or service window to connect the mobile device. The QR code can contain a unique identifier and/or address to enable and/or trigger connection via Bluetooth, Wi-Fi, or other similar protocol. The mobile device application can use a mobile device's NFC reading capabilities to read the connection details from the gaming device. The gaming server can act as a gate to establish the connection between the gaming device of choice and the player's mobile device such as using a URL displayed by the gaming device The DND logic can automatically activate the DND mode (e.g., synchronized with notifications of the gaming device's in-game events) upon pairing and can automatically terminate the DND mode after cashing out or after the credit meter is (close to) 0 credits and no interaction has been made by the player/user for a selected number (X) of minutes.

The security instruction set 218, when executed by the processor 204, may enable active connection with only a predetermined number (e.g., 1) mobile device of the user to maintain the player's security (e.g., if multiple mobile devices were connected at a time, they might spy notifications being sent by/through the gaming device).

The security instruction set 218, when executed by the processor 204, may require the player to have their mobile device registered with the casino (e.g., using a unique identifier or ID) and only registered devices can be used to synchronize with the gaming device/gaming system. Upon authentication, a security token of the mobile device can be retrieved and verified by the gaming system.

The security instruction set 218, when executed by the processor 204, may register new mobile devices on the fly upon first pairing; retrieve required security information from the mobile device, and recognize the mobile device upon a next pairing.

The security instruction set 218, when executed by the processor 204, may verify carded information (e.g., from a player tracking card inserted into or otherwise read by the gaming device) as an additional authentication check. The gaming system can associate the mobile device with the tracking card information and not require further security measures for pairing if both match upon a pairing attempt.

As an example of a secure reconnection of a mobile device to a gaming device using a player card, a player logs onto a gaming device via a player card. The mobile device is known by the player's account, and the gaming device prompts a confirmation on the player's mobile device (by a dedicated application on the mobile device), and the player accepts the prompt (e.g., by a swipe) to initiate establishing the connection between the mobile device and the gaming device. The mobile device application can display a code (e.g., 4 digits), and the player is prompted to enter the code on the gaming device's user interface to establish the connection. The mobile device application may display other codes such as patterns, sequences, etc., to be input on the gaming device.

The security instruction set 218, when executed by the processor 204, may automatically terminate a DND-mode connection (either to the gaming device or system) once a player has moved too far away as determined by sensor feedback, such as based on geolocation tracking (that tracks player position via triangulation), camera/surveillance tracking (same as above but camera-tracked using facial recognition or other similar techniques), technology-based range limits (e.g., Bluetooth or Wi-Fi—where disconnecting the wireless connection based on range terminates the session), and the like. If the player is too far away or has left the premises, the connection is auto-terminated.

The security instruction set 218, when executed by the processor 204, may temporarily lock DND mode mechanisms such as when the player has moved too far away (e.g., disable notifications and display notification icons on a user interface display on the gaming device if the connected mobile device has moved too far away).

The security instruction set 218, when executed by the processor 204, may employ multi-factor authentication techniques. To increase user convenience, the security instruction set 218, when executed by the processor 204, may require the player to use multi-factor authentication techniques only for the first authentication on that day and single factor authentication in subsequent pairing attempts.

A number of security techniques can be employed to avoid malicious content or other third party intrusion from accessing the data connection. A firewall and/or virus scanning software within the gaming machine can scan, verify, and allow for connection directly between mobile device and gaming device. A central firewall and/or virus scanning software can be located in other logical or virtual locations within the gaming system to scan, verify, and require every transaction to be processed through the gaming system (e.g., use encrypted wireless or wired protocols for data transmission).

In addition to the viral detection techniques noted above, the security instruction set 218, when executed by the processor 204, may allow trusted connections (e.g., Wi-Fi) between the gaming device and mobile device over a predetermined protocol, such as https only. Other limitations may be based on data format, such as only allowing data transmission using a harmless data format that cannot cause any security concerns. The data exchange can be encrypted, such as by a Transport Layer Security (TLS), Secure Sockets Layer (SSL), or any other security encryption protocol for any types of data exchange. As will be appreciated, an encryption algorithm transforms data into ciphertext and uses an encryption key to alter the data in a predictable way, so that even though the encrypted data will appear random, it can be turned back into plaintext by using the decryption key.

The security instruction set 218 may control gaming system behavior upon loss and/or interruption of the gaming device and mobile device connection. The mobile device application or security instruction set can attempt reestablishing connection a predetermined number (x) times and, if unsuccessful, timeout and disconnect. Upon a single disconnect, the security instruction set 218 can force reconnection and authentication as described above and automatically reconnect if it happens within a set timeframe (e.g., 3 seconds).

The security instruction set 218 may terminate connections upon occurrence of a predetermined gaming event, such as cash out, loss of connection, loss or absence of player manual inputs, or other timeout (e.g., no activity).

As will be appreciated, other security techniques may be employed by the security instruction set 218 in lieu of or addition to the techniques above.

The communication notification instruction set 220, when executed by the processor 404, may enable the gaming device to provide received communication notifications on a target user interface display of the mobile device, gaming device, or both. The communication notification instruction set 220, based on the determined state of the mobile device or gaming system, can select a set of presentation parameters for one or more communications, the set of presentation parameters comprising one or more of identification of the target user interface (e.g., display, speaker, etc.) on a gaming device of the gaming system and/or the player's mobile device for providing the communication, a presentation frequency for presenting received communications to the player (e.g., presenting cached received communications for every X received communications), a display notification object type, size, or display location to notify the player of one or more received communications awaiting presentation to the player, a display notification announcement sound type, volume, or speaker location to notify the player of one or more received communications awaiting presentation to the player, and/or a time interval during which received communications awaiting presentation to the player are to be cached for later presentation to the player (e.g., every 5 minutes, 10 minutes, etc.).

The event monitor instruction set 222, when executed by the processor 204, may enable the gaming device based on sensor input to detect player activity at the gaming device 112 and other gaming events and notify the gaming server 116 of an instance of detected player 124 interaction, a type of player 124 interaction detected, and a timestamp from a system clock 274 and associated with the player 124 interaction and enable the gaming device 112 and mobile device 114 to monitor operations of components of the gaming system 100 in response to interaction with players. Types of player interaction with the gaming device 112 can comprise, for example, physical contact of an input of the gaming device by a player 124, a gaming activity or event such as a game outcome, a change in a credit amount maintained by the credit meter instruction set 210 associated with the gaming device 112, and the like.

To enable the gaming server 116 to track the player activity and other gaming events, such as by sensor output, the event monitor instruction set 222, when executed by the processor 204, causes the processor 204 to forward, to the gaming server 116 and mobile device 114 through the network communications interface, a first electronic message comprising a unique identifier of the gaming device, a first identifier of a first player in a gaming session, a first description of a first gaming activity of the first player in the gaming session, and a first timestamp associated with occurrence of the first gaming activity, update a first electronic record associated with the gaming session to reflect the first gaming activity, forward, to the gaming server through the network communications interface, a second electronic message comprising the device identifier, a first identifier of the first player in the gaming session, a second description of a second gaming activity of the first player in the gaming session, and a second timestamp associated with occurrence of the second gaming activity, update a second electronic record associated with the gaming session to reflect the second gaming activity, at a conclusion of the gaming session, receive a third electronic message comprising the gaming device identifier, the first identifier, a third description of a third gaming activity, and a third timestamp associated with occurrence of the third gaming activity, the third description indicating an outcome of the gaming session, and update a third electronic record to reflect transfer of an award to an account of the player.

The communication instruction set 226, when executed by the processor 204, may enable the gaming device 112 to communicate with the central gaming server 116 and/or a mobile device 114. In some embodiments, the communication instruction set 226 may include instructions that enable the gaming device 112 to pair with the mobile device 114 and establish a communication channel with the personal gaming mobile device via the pairing. As an example, the communication instruction set 226 may include instructions that enable NFC, Bluetooth®, Wi-Fi, or other types of communication protocols. It should be appreciated that the communication instruction set 226 may also be updated to reflect when a mobile device 114 is paired with the gaming device 112 and such pairing information may include addressing information for the mobile device 114 and/or identification information associated with the player 124 of the mobile device. Alternatively or additionally, the communication instruction set 226 may enable the gaming device 112 to identify a player 124 of the mobile device 114 and identify a player account or profile associated with the identified player. In some embodiments, the communication instruction set 226 may be configured to operate or drive the network interface 224 to facilitate direct or indirect communications with a mobile device 114.

While shown as separate instruction sets, it should be appreciated that any of the game control instruction set 206, credit meter instruction set 210, DND instruction set 212, DND rulesets 214, security instruction set 218, communication notification instruction set 220, event monitor instruction set 222, and communication instruction set 226 may correspond to a subroutine of the game control instruction set 206 without departing from the scope of the present disclosure.

The gaming device 112 is further shown to include a ticket issuance device 250, a ticket acceptance device 254, a currency in device 258, a currency out device 262, and a card reader 266. The ticket issuance device 250 may be configured to print physical tickets, vouchers, or the like. The ticket acceptance device 254 may be configured to receive, scan, and/or recognize information from an input physical ticket, voucher, or cash. In some embodiments, the ticket issuance device 250 and ticket acceptance device 254 may operate in concert with a common piece of hardware that both accepts and produces physical tickets, vouchers, or the like. Tickets or vouchers printed by ticket issuance device 250 and recognizable by the ticket acceptance device 254 may correspond to physical lottery tickets, casino vouchers, paper coupons, and the like. Alternatively or additionally, the ticket issuance device 250 and/or ticket acceptance device 254 may be connected to ticket or cash reading hardware. In such an embodiment, the ticket issuance device 250 and ticket acceptance device 254 may operate as a driver and/or firmware component for the card reader. In some embodiments, multiple players each have a different individual credit meter but use or share a common ticket that is printed by ticket issuance device 250 and recognizable by the ticket acceptance device 254. The players pass the common ticket back and forth as desired to perform player-specific transactions with the gaming device 112.

Similarly, the currency in device 258 and currency out device 262 may include or operate in concert with a coin slot or any other type of coin delivery mechanism. The currency in device 258 and currency out device 262 may include hardware, drivers, or firmware that facilitate receiving or distributing tokens, coins, chips, etc. In some embodiments, the currency in device 258 may be configured to determine an amount of coins (an amount of tokens, an amount of chips, etc.), input at the coin slot and convert the values into credits for playing games. The currency out device 262 may correspond to hardware and software configured to output coins, tokens, chips, etc. if a player decides to cash out or convert playing credits back into coins, tokens, or chips, etc.

The card reader 266 may include hardware and/or software configured to read or accept any type of card, or portable credential (e.g., NFC, Bluetooth, Wi-Fi, etc.). In some embodiments, the card reader 266 may include hardware and/or software that enable contactless reading of a card, token, or portable credential. In some embodiments, the card reader 266 may include hardware and/or software that enable contact-based reading of a card, token, or portable credential (e.g., magstripe, chip reader, electrodes, card-receiving slot, etc.). It should be appreciated that the card reader 266 may be configured to receive and read a card or portable credential, token, in any type of format (e.g., portable plastic card, magstripe card, key fob, etc.). It should also be appreciated that the card reader 466 may be configured to write information or data onto a card or portable credential. Furthermore, in some embodiments, the card reader 466 may be configured to read a player loyalty card in the form of a plastic credit-card shaped credential. In some embodiments, the card reader 266 may enable communications with a loyalty application operating on a player's personal gaming device.

The gaming device 112 may include one or more display devices 270 configured to render information, live video, communications windows, wagering interface windows, games, interactive elements, and/or other visual output to one or more display screens. The gaming device 112 may include one or more display controllers configured to control an operation of the display device 270. This operation may include the control of input (e.g., player input via the user interface 216, command input via the instruction sets in memory 208, combinations thereof, etc.), output (e.g., display, rendered images, visual game behavior, etc.) and/or other functions of the display device 270.

In an embodiment, the display device 270 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display.

The display device 270 may include a display driver, a power supply, an input/output, and/or other components configured to enable operation of the display device 270. The display driver may receive commands and/or other data provided by the processor 204 and one or more of the instruction sets in memory 208. In response to receiving the commands, the display driver may be configured to generate the driving signals necessary to render the appropriate images to the display screen. The power supply may provide electric power to the components of the display device 270. In some embodiments, the power supply may include a transformer and/or other electronics that prevent overloading, condition power signals, and/or provide backup power to the display device 270. The input/output may correspond to one or more connections for receiving or exchanging information and/or video from components of the gaming device 112. The input/output may include an interconnection to the network interface 224. By way of non-limiting example, the input/output may include a high-definition multimedia interface (HDMI) input, Ethernet, composite video, component video, H.264, or other video connection.

The gaming device 112 can further include a system clock 274 for timestamp creation. The system clock 274 can be implemented in hardware (e.g., a quartz crystal oscillator) or software that generates and sends out a timing signal on a regular or periodic basis to all other computer components of the gaming device 112 to synchronize the various components operations. In some embodiments, the gaming device 112 comprises both a hardware clock known as the Real Time Clock and a software clock.

In some embodiments, the gaming device comprises a service window 278 that exchanges electronic messages with the gaming server 116 and controls one or more of the display device(s) 270.

In some embodiments, the gaming device uses a Slot Accounting System (SAS) protocol to provide automated gaming device meter reporting, real-time event logging, exception reporting, electronic and/or advanced (cashless) funds transfer, ticket in/ticket our functionality, multi-denomination accounting, gaming device configuration reporting, game accounting, and game bonusing and control progressives, among other functions.

Figure 3:
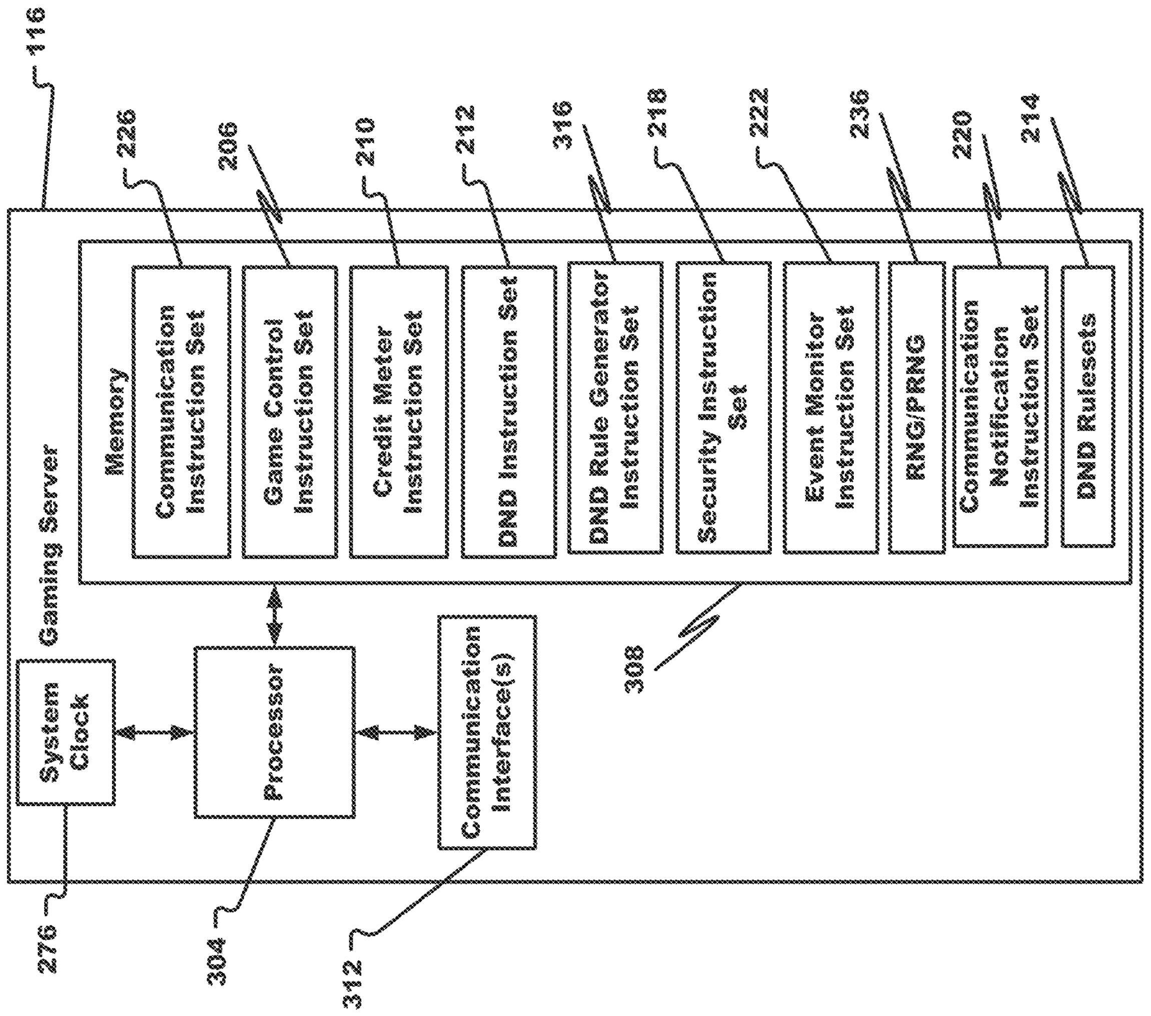
FIG. 3 is a block diagram depicting a gaming server in accordance with embodiments of the present disclosure.

With reference now to FIG. 3, additional details of a gaming server 116 will be described in accordance with embodiments of the present disclosure. The gaming server 116 is shown to include a processor 304, memory 308, and a plurality of communication interfaces 312. These resources may enable functionality of the gaming server 116 as will be described herein. For instance, a communication interface 312 may provide the gaming server 116 with the ability to send and receive communication packets or the like over the gaming network 104. The communication interface 312 can also facilitate communications with the mobile devices 114 via the communication network 108. The communication interface 312 may be provided as a network interface card (NIC), a network port, drivers for the same, and the like. Communications between the components of the gaming server 116 and other devices connected to the gaming network 104 may all flow through the communication interface 312.

The processor 304 may correspond to one or many computer processing devices. The processor 304 may be configured to execute one or more instruction sets stored in memory 308. Upon executing the instruction sets stored in memory 308, the processor 304 enables various authentication functions of the gaming server 116.

The memory 308 may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 308 include, without limitation, the communication instruction set 226, the game control instruction set 206, the credit meter instruction set 210, the DND instruction set 212, the DND rule generator instruction set 316, the security instruction set 218, the event monitor instruction set 222, communication notification instruction set 220, and DND rulesets 214. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein. Although not depicted, the gaming server 116 may include instructions that enable a processor to store data into the database 184 and retrieve information from the database 184. Alternatively or additionally, the database 184 or data stored therein may be stored internal to the gaming server 116 (e.g., within the memory of the server 116 rather than in a separate database).

Unlike the gaming device 112, the memory 308 includes the DND rule generator instruction set 316 that generates DND rulesets 214 based on various criteria, including the player preferences and other player profile and account information on the gaming system, the player preferences and other player profile and account information on the mobile device, observed player behavior based on sensor and mobile device input, gaming device and game type and configuration, and gaming system policies and requirements. The generated rulesets can comprise a number of rules, including rules relating to communication suppression and notification by source, recipient(s), type, modality, content, and priority of communication, communication and notification presentation parameters and rules, manual DND mode activation and deactivation, automatic DND mode activation and deactivation trigger events, and other factors.

Both the gaming device 112 and gaming server 116, each include a random number generator or pseudorandom number generator (RNG/PRNG) 236, like the PRNG/RNG 236, is used to generate a random event as noted above. The RNG/PRNG 236 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGs), which generate numbers that look random, but are actually deterministic, and can be reproduced if the state of the PRNG were known. In some applications, the RNG/PRNG 548 uses computational algorithms that can produce long sequences of apparently random results, which are in fact determined by a shorter initial value, known as a seed value or key.

In one embodiment, the RNG/PRNG 236 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 236 is a cryptographic random number generator.

Figure 4:
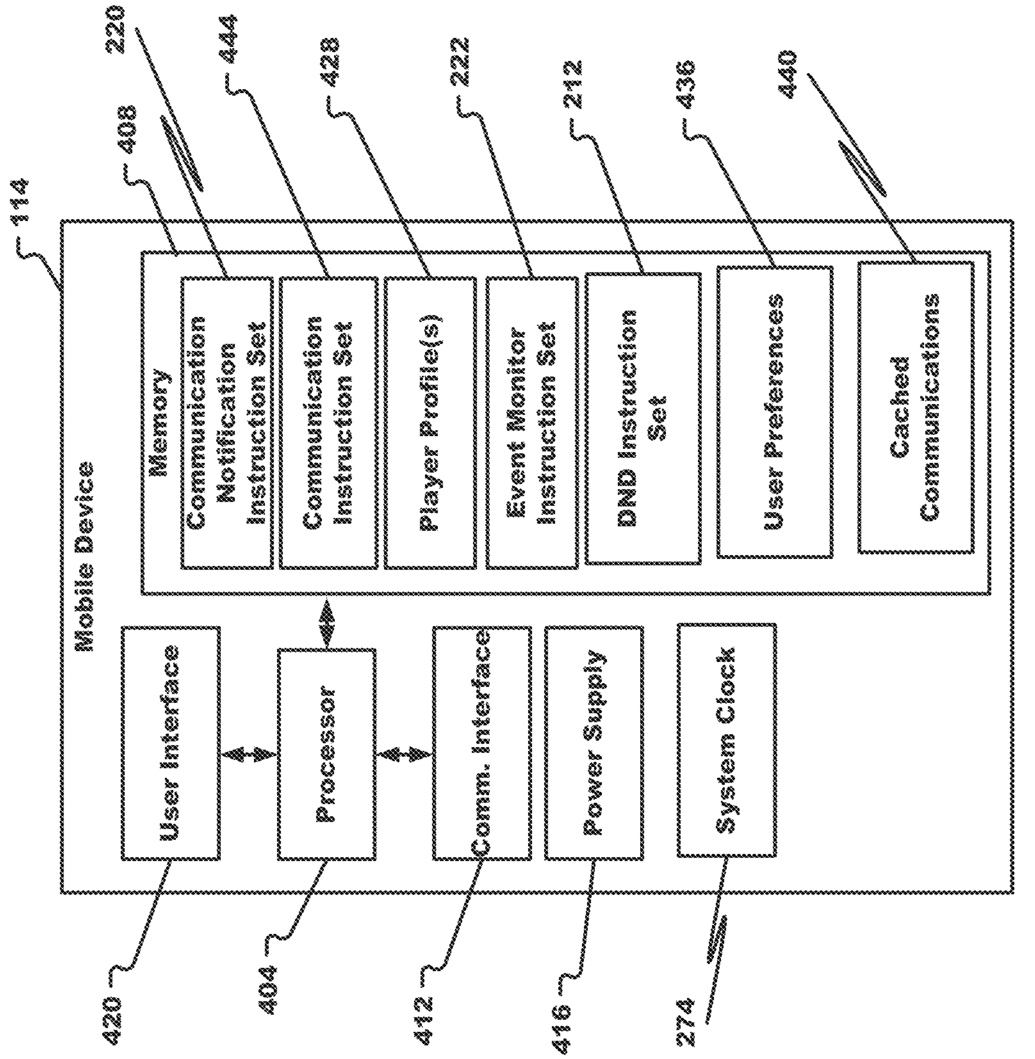
FIG. 4 is a block diagram depicting a mobile device in accordance with embodiments of the present disclosure.

With reference now to FIG. 4, additional details of the components that may be included in a mobile device 114 will be described in accordance with at least some embodiments of the present disclosure. The mobile device 114 includes a processor 404, memory 408, a communication interface 412, and a user interface 420. In some embodiments, the processor 404 may be similar or identical to any of the other processors 204, 304 depicted and described herein and may correspond to one or many microprocessors, CPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 114 to provide game play functionality, interact with gaming devices 112, pair with gaming devices 112, or any other type of desired functionality.

The communication interface 412 may be similar or identical to the network interface 224 and/or communication interfaces 312 depicted and described herein. The nature of the communication interface 412 may depend upon the type of communication network 108 for which the mobile device 114 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 114 is connecting to a single communication network 108 or multiple different types of communication networks. For instance, the mobile device 114 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 114.

The memory 408 may be similar or identical to other memory 208, 308 depicted and described herein and may include one or multiple computer memory devices that are volatile or non-volatile. The memory 408 may be configured to store instruction sets that enable player interaction with the mobile device 114 and that enable game play at the mobile device 114. Examples of instruction sets that may be stored in the memory 408 include a game interaction instruction set (not shown), communication notification instruction set 444, player profile(s) 428, event monitor instruction set 222, user preferences 436, DND instruction set 212, cached received communications 440, and a communication instruction set 226. In addition to the instruction sets, the memory 608 may also be configured to store data that is useable by the various instruction sets.

In some embodiments, the game interaction instruction set, when executed by the processor 404, may enable the mobile device 114 to facilitate one or more games of chance or skill and management of one or more player engagement indicator sets.

The player profile(s) 428 include a variety of player-specific data structures including player identification and login credentials.

The communication instruction set 444, when executed by the processor 404, may enable the mobile device 114 to communicate via the communication network 108. In some embodiments, the communication instruction set 444 may be similar or identical to the communication instruction set 226 and may be particular to the type of communication network 108 used by the mobile device 114. As an example, the communication instruction set 444 may be configured to enable cellular, WiFi, and/or Bluetooth communications with other devices. The communication instruction set 444 may follow predefined communication protocols and, in some embodiments, may enable the mobile device 114 to remain paired with a gaming device 112 as long as the mobile device 114 is within a predetermined proximity (e.g., 20-30 feet, an NFC communication range, or a Bluetooth communication range) and paired with the gaming device 112.

In some embodiments, the communication instruction set 444 enables a mobile device application of the mobile device to negotiate a secure, authenticated connection with the proper functionality, versions and security settings. This can be done using any of the authentication methods discussed above to effect cardless authentication. In other embodiments, player card-based authentication is performed using the card reader 266 of the gaming device 112.

The user preferences 436 may correspond to DND preferences that are desired by the player 124 of the mobile device 114, such as related to received communication caching and notifications, DND triggering events, whitelisting, blacklisting, exception handling, and other DND preferences.

The cached received communications 440 indicate the received communications received during DND mode activation that are suppressed or otherwise stored pending presentation to the player at occurrence of a selected event or deactivation of the DND mode.

The mobile device 114 is also shown to include a power supply 416. The power supply 416 may correspond to an internal power supply that provides AC and/or DC power to components of the mobile device 114. In some embodiments, the power supply 416 may correspond to one or multiple batteries. Alternatively or additionally, the power supply 416 may include a power adapter that converts AC power into DC power for direct application to components of the mobile device 114, for charging a battery, for charging a capacitor, or a combination thereof.

The mobile device 114 is also shown to include a system clock 274 providing timing output synchronized to the timing output of system clocks of the gaming device and server.

Figure 5A:
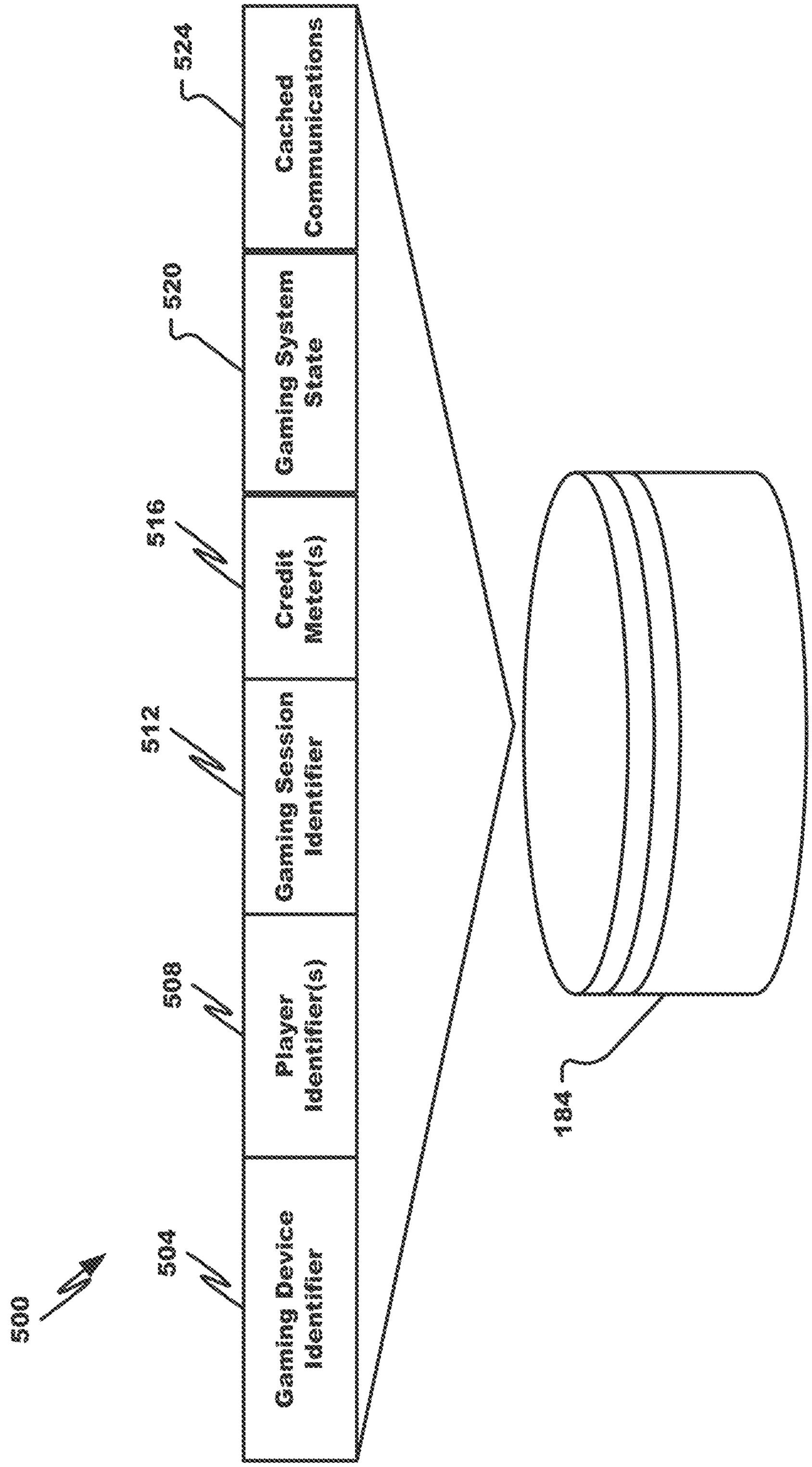
FIG. 5A is an illustrative data structure used in a DND mode in accordance with embodiments of the present disclosure.
Figure 5B:
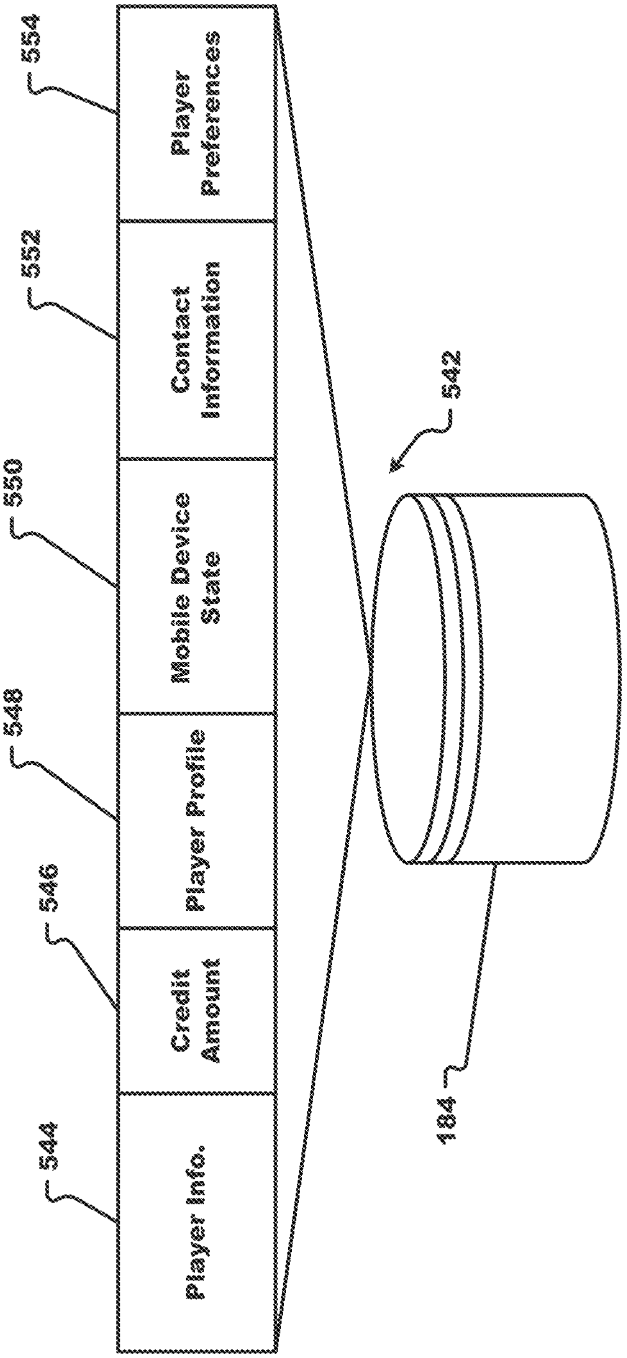
FIG. 5B is an illustrative data structure used in a player profile in accordance with embodiments of the present disclosure.

With reference now to FIGS. 5A-B, additional details of data that may be stored in the database 184 will be described in accordance with at least some embodiments of the present disclosure. The database 184 may be configured to store one or multiple data structures 500 that are used in connection with the various types of player engagement indicators employed by the gaming system 100.

With reference to FIG. 5A, the data structures 500 may include a plurality of data fields that include, for instance, a gaming device identifier field 504, player identifier(s) field 508, gaming session identifier field 512, credit meter field 516, gaming system state 520, and cached communications 524.

The gaming device identifier field 504 may be used to store any type of information that identifies uniquely a gaming device 112 within the gaming system 100. The identifier field 504 may include a numeric, alphabetical or alphanumeric identifier or descriptor of the gaming device 112. In one example, the identifier field 504 comprises a unique electronic address of the corresponding gaming device 112 on the gaming network 118.

The player identifier(s) field 508 may be used to store any type of information that identifies uniquely one or more players currently interacting with the respective gaming device 112 identified in the gaming device identifier field 504. The identifier field 508 may include a numeric, alphabetical or alphanumeric identifier or descriptor of each such player. In one example, the identifier field 508 comprises a unique electronic address of the corresponding players mobile device 114 on the communications network 108. In one embodiment, the identifier field 508 comprises a unique identifier of the corresponding player associated with the player's account.

The gaming session identifier field 512 may be used to store any type of information that identifies uniquely a gaming session involving the identified one or more players currently interacting with the respective gaming device 112 identified in the gaming device identifier field 504. The gaming session identifier may be a numeric, alphabetical or alphanumeric identifier or descriptor of each such gaming session.

The gaming system state field 520 comprises data related to the current gaming system state. As noted, the gaming system state can refer to information describing a gaming session with a specific player, a plurality of gaming sessions with multiple players on different gaming devices, and a level of occupancy of gaming machines or spatial areas of the casino. The state of the gaming system can be for the gaming system as a whole or for a component thereof, such as a gaming device (e.g., EGM). Accordingly, the gaming system state can refer to information describing an interactive session by a user with a user interface or mobile device application. The state of the gaming session, for instance, can include one or more of one or more of a characteristic of the gaming session with a selected player (e.g., speed of play, cash in amount, wager behavior, wagering speed, cash out amount, play session length, additional in-session cash in amounts, and idle time), occurrence of an in-game event during the gaming session, connection of a communication device (e.g., mobile device) of the player to the gaming system.

The credit meter(s) field 516 comprises player credit meter data associated with a player identified in the player identifier(s) field 508 and a gaming session identified in the gaming session identifier field. The data in each of the credit meter fields comprises previously received credit information and an associated timestamp and a current credit amount balance in the corresponding credit meter.

The cached communications 524 comprise received communications from the player's mobile device 114 and gaming server 116 that are awaiting presentation to the player 124 at a selected time during the activated DND mode or after the DND mode is deactivated.

With reference now to FIG. 5B, additional details of data that may be stored in the database 184 will be described in accordance with at least some embodiments of the present disclosure. The database 184 may be configured to store one or multiple data structures 542 that are used in connection with gaming activities of a player. In some embodiments, the data stored in the data structures 542 may be stored for a plurality of different player profiles or for a single player profile. The data structures 542 may include a plurality of data fields that include, for instance, a player information field 544, a credit amount field 546, player profile field 548, mobile device state field 550, contact information field 552, and player preferences field 554.

The player information field 744 and contact information field 754 may be used to store any type of information that identifies a player. In some embodiments, the player information field 744 may store one or more of username information for a player 324, contact information for the player (such as email address, phone number, social website webpage universal resource locator, and the like), password information for a player account, player status information, accommodations associated with the player 324, and any other type of customer service management data that may be stored with respect to a player 324.

The credit amount field 746 may be used to store data about a player's 324 available credit balance with the casino or a plurality of casinos. For instance, the credit amount field 746 may contain a link to the player's corresponding credit meter field in data structures 700.

The player profile field 548 may be used to store data player profile information, such as information that identifies or describes the player, such as their name, age, and individual characteristics such as player gaming history, ranking, and account level. Player ranking may be measured in various ways. In one embodiment, the player ranking is based on membership in a platinum, gold, silver, or bronze class, with platinum being the highest value to the casino and bronze the lowest. In one embodiment, the player ranking is based on a proficiency level or performance rank in one or more gaming sessions. Other player loyalty classification schemes are possible depending on the application. The player profile field may also store data related to awards, bonuses, mini bonuses, jackpots, side bets, etc. granted to the player 124.

The mobile device state field 550 may be used to store information regarding the current state of the mobile device. As noted, the mobile device state refers to any information regarding a mobile device condition, configuration, activity or set of activities, condition regarding one or more stored inputs or other state information.

The contact information field 552 can include the player's contact information, including residential and electronic addresses and mobile device identification information, including telephone number and other unique mobile device identification information, security information for secured communications with the mobile device (e.g., symmetric and asymmetric keys), and the like.

The player preferences field 554 can include information regarding player preferences, including DND preferences noted above.

A gaming session example will now be described to illustrate the teachings of the present disclosure.

Figure 6:
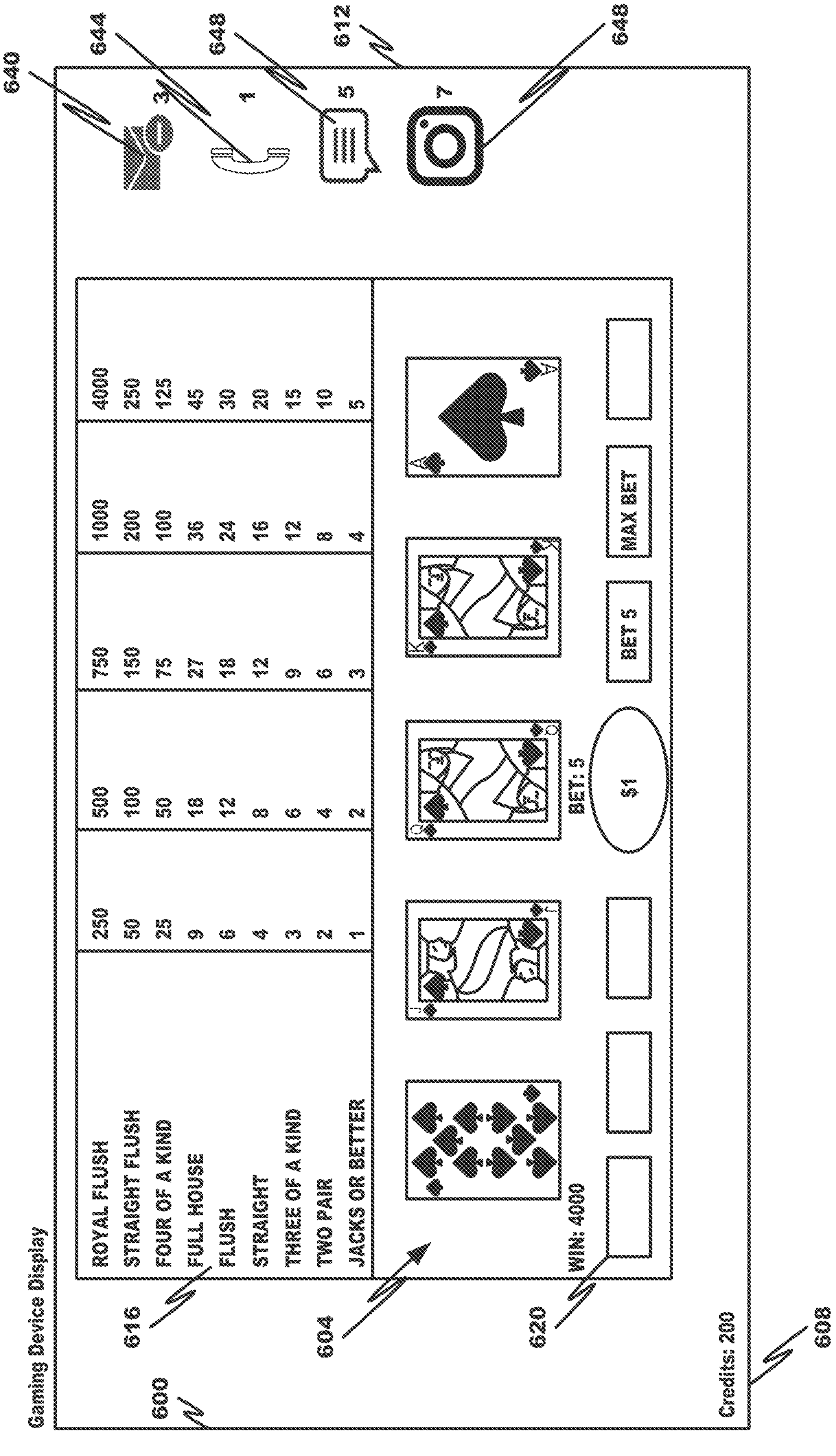
FIG. 6 is a screenshot of a gaming device display during a DND mode in accordance with embodiments of the present disclosure.

FIG. 6 depicts a display device 608 of a gaming device 112 displaying on display 600. FIG. 6 depicts a screen shot of the display device 608 in a video poker gaming session. The display 600 comprises the player's hands 604 and credit meter 608. The upper sub-display region 616 displays the various winning outcomes of the gaming session as well as a corresponding number of credits paid for each outcome. The lower sub-display region 620 displays various selectable icons for wagering and other player commands. In the right-hand side 612 of the display 600, different received communication modalities are depicted, including an email icon 640, phone call 644, text message 648, and Instagram 652. Each of the icons has an associated number indicating a number of received communications of that type that are cached for presentation to the player when the DND ruleset permits. Accordingly, cached communications comprise three emails, one voice message from an incoming unanswered call, five text messages, and seven Instagram messages. As will be appreciated, other types of icons and other types of communication modalities may be employed depending on the implementation. As will be appreciated, the icons may be used with other types of games, such as slots.

The notification icons can be located at any display location depending on the implementation, such as the lower sub-display region 620. The notifications can be displayed during or after a game or gaming session—or after the game has returned to "normal mode". The DND logic can mute the mobile device while the mobile device is being connected and instead show the notifications on display device 608. The refresh rate of the notification icon can be any time interval depending on the player and gaming system preferences, e.g., every 5 minutes (in addition to being synchronized to the gaming system or mobile device state).

Figure 7:
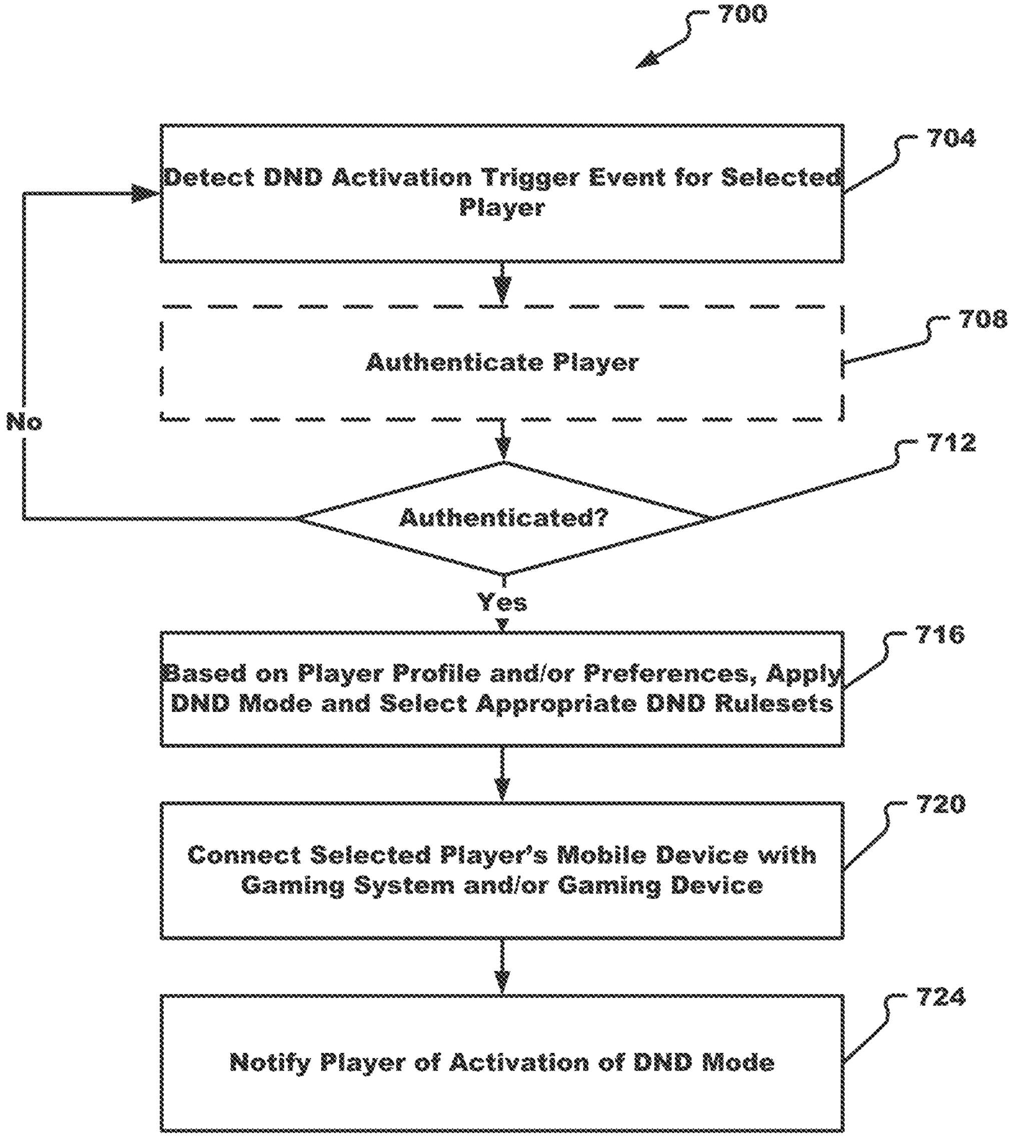
FIG. 7 is a flow diagram depicting a method of activating DND mode in accordance with embodiments of the present disclosure.
Figure 8:
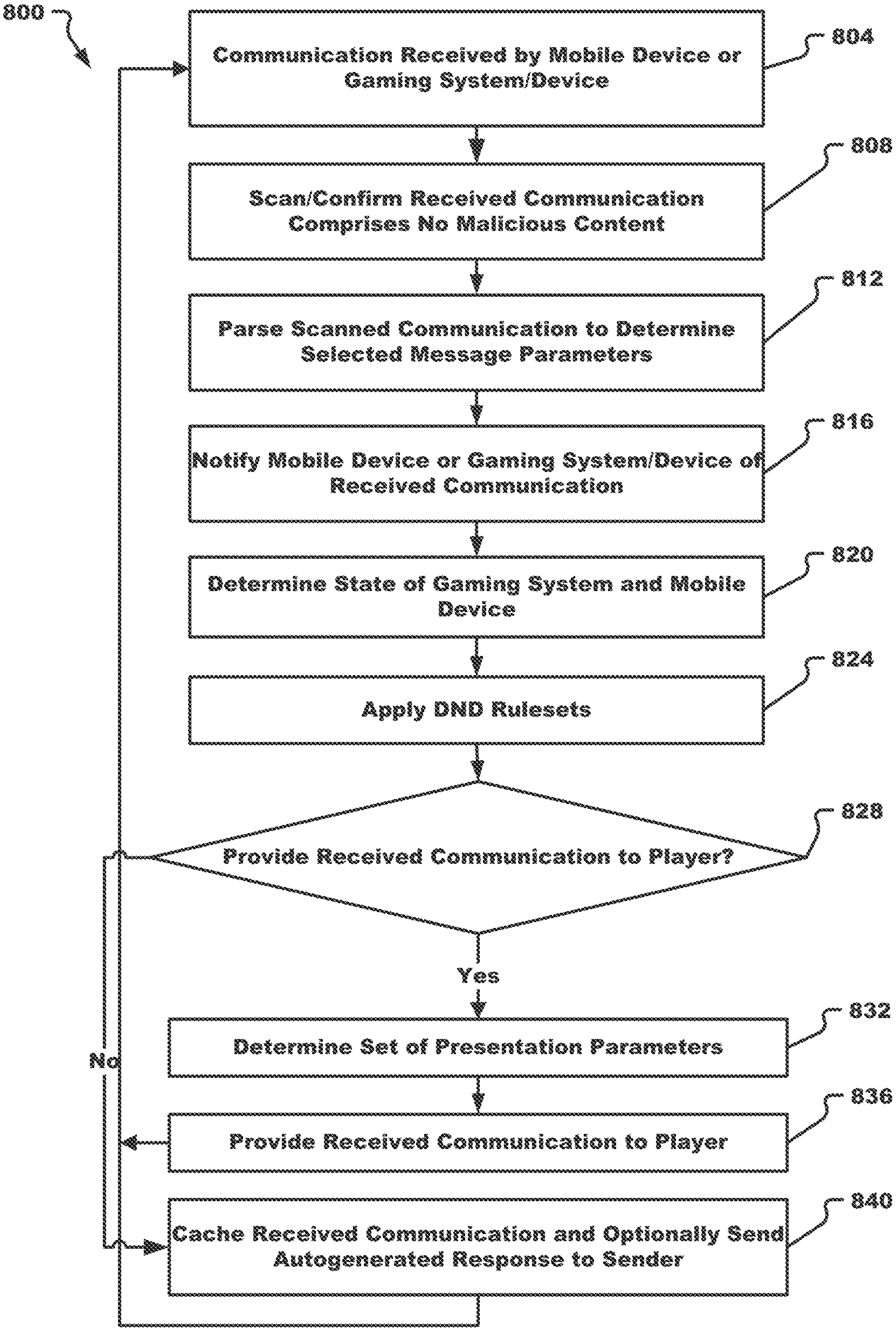
FIG. 8 is a flow diagram depicting a method of managing received communications during DND mode in accordance with embodiments of the present disclosure.
Figure 9:
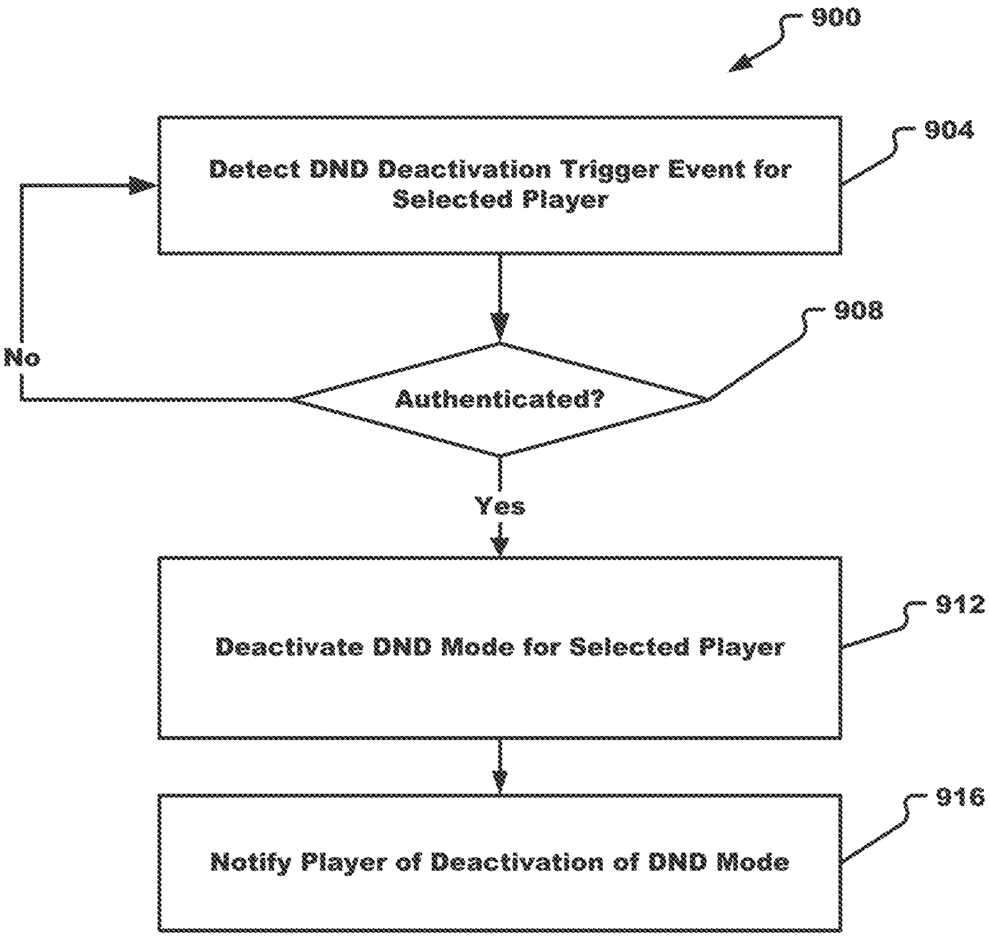
FIG. 9 is a flow diagram depicting a method of activating DND mode in accordance with embodiments of the present disclosure.

FIGS. 7-9 depict logic flows for different embodiments of the present disclosure. As will be appreciated in the embodiments, the gaming system 100 could be created for a group of machines, an entire casino, or multiple casinos. The processors in the gaming machines 112 communicate with each other and the gaming server either directly or through a SMIB (Slot Machine Interface Board) and/or service window. The service window is a display that represents a slot account host or gaming server 116. It can be displayed on the SMIB or could be a display on the EGM screen (e.g., a web browser displayed on the EGM that interacts with the gaming server). A mobile application on the player's mobile device 114 can communicate with the service window or SMIB and that service window or SMIB can in turn communicate with the gaming server 116 to allow the mobile application user to perform various gaming operations. The mobile application would have some mechanism for the user to log into their player account, such as any of the authentication methods described herein. In this model, the gaming server 116 can transfer the award amount to the gaming device 312 such as by an SAS AFT transfer.

In some embodiments, each gaming session alternately controls the entire gaming device display, or across the display sub-regions of each player. In other words, common paylines from either the first or second gaming session appear across the entire gaming device display, or across the display sub-regions of each player.

With reference now to FIGS. 7-9, a method of activating and deactivating the DND mode and processing received communications during an activated DND mode will be described in accordance with embodiments of the present disclosure.

Referring to FIG. 7, the method for activating the DND mode begins in step 704 with the gaming system or mobile device detecting a DND activation trigger event for a selected player.

The method may continue in step 708 with the optional step of authenticating the player as discussed above.

The method may continue in decision diamond 712 by determining whether or not the player has been authenticated successfully. If not, the method returns to step 704. If so, the method may continue in step 716.

The method may continue in step 716 by the gaming system or mobile device, based on the player profile and/or preferences, applying the DND mode and selecting an appropriate DND ruleset. This selection may be based on generic rulesets for multiple players or rulesets configured or customized for the specific player.

The method may continue in step 720 by the mobile device or gaming system connecting the mobile device with the gaming system and/or gaming device for the purpose of synchronizing the exchange of received communications and mobile and gaming system state notifications.

The method may continue in step 724 by the gaming system or mobile device notifying the player of activation of the DND mode.

The logic returns to step 704 to await a further or next trigger event for a next player.

With reference now to FIG. 8, a method of processing received communications during an activated DND mode will be described in accordance with embodiments of the present disclosure.

The method begins in step 804 by an incoming communication being received from a third party by the mobile device or from the gaming server by the gaming device.

In step 808, the receiving mobile device or gaming device scans the communication and confirms that the communication is free of malicious content.

In step 812, the scanned communication is parsed to determine the selected message parameters. The parameters include, for example, communication type, modality, source, content, and priority.

In step 816, the receiving mobile or gaming device notifies the other of the gaming device and mobile device of the received communication.

In step 820, the DND logic, on the mobile device or gaming system, determines a state of the gaming system and mobile device. As noted, the mobile device and gaming system periodically exchange state update messages to enable the mobile device to have an updated data structure recording the current gaming system state and the gaming system to have an updated data structure recording the current mobile device state.

In step 824 the DND logic in the mobile device or gaming system, as appropriate, apply the relevant DND rulesets from step 716 and in decision diamond 828 determine whether the received communication is to be provided to the player or cached for later presentation.

When the received communication is to be presented without delay, the DND logic proceeds to step 832 and determines the appropriate presentation parameters and in step 836 provides the received communication to the player.

When the received communication is not to be presented to the player but cached, the DND logic in step 840 caches the received communication and optionally sends an auto-generated response to the sender as noted above.

After steps 838 or step 840, the DND logic returns to step 804.

Referring to FIG. 9, the method for deactivating the DND mode begins in step 904 with the gaming system or mobile device detecting a DND deactivation trigger event for a selected player.

The method may continue in decision diamond 908 by determining whether or not the selected player has been authenticated successfully.

When the selected player has not been authenticated successfully, the method returns to step 904 and awaits a next deactivation trigger event.

When the selected player has been authenticated successfully, the method may continue in step 912 by deactivating the DND mode for the selected player.

The method may continue in step 916 by the gaming system or mobile device notifying the player of deactivation of the DND mode.

The logic returns to step 904 to await a further or next trigger event for a next player.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A system comprising:

a communication interface;

a processor coupled with the communication interface; and a non-transitory computer-readable storage medium coupled with the processor, the computer-readable storage medium storing instructions thereon that enable the processor to:

determine a state of a gaming system;

receive, during a gaming session between a player and the gaming system, a communication to be provided to the player;

when the determined state of the gaming system is a first gaming system state, provide the received communication to the player during the gaming session; and when the determined state of the gaming system is a second gaming system state different from the first gaming system state, delay providing the received communication to the player during the gaming session until the state of the gaming system is the first gaming system state.

2. The system of claim 1, wherein the state of the gaming system comprises one or more of a characteristic of the gaming session, occurrence of an in-game event during the gaming session, connection of a communication device of the player to the gaming system, wherein the characteristic of the gaming session comprises one or more of speed of play, cash in amount, wager behavior, wagering speed, cash out amount, play session length, additional in-session cash in amounts, and idle time, and wherein the communication comprises one or more of a text communication, a video communication, a pop-up, a gaming system notification, advertisement, announcement, and an information feed.

3. The system of claim 1, wherein the stored instructions are part of an application executing on a communication device of the player, wherein the communication device is wirelessly connected to the gaming system, and wherein, when the determined state of the gaming system is the second gaming system state, the communication is cached by the application for later presentation by the communication device to the player.

4. The system of claim 1, wherein the received communication is addressed to a communication device of the player and wherein the stored instructions further enable the processor, based on the determined state of the gaming system, to select a set of presentation parameters for the communication, the set of presentation parameters comprising one or more of identification of a target display on a gaming device of the gaming system and/or the communication device of the player for providing the communication, a presentation frequency for presenting received communications to the player, a display notification object type, size, a display location to notify the player of a number of received communications awaiting presentation to the player, and a time interval during which received communications awaiting presentation to the player are to be cached for later presentation to the player.

5. The system of claim 1, wherein the stored instructions further enable the processor, when the determined state of the gaming system is the second gaming system state, to apply a set of filtration rules to determine whether to cache the received communication for delayed presentation to the player after the gaming session or provide the communication to the player during the gaming session.

6. The system of claim 5, wherein the set of filtration rules are based on one or more of the following parameters: a source of the received communication, a type or modality of the received communication, content of the received communication, and a priority of the received communication, and wherein the stored instructions further enable the processor to scan the received communication for malicious content and, when the received communication comprises malicious content, prevent presentation of the received communication in the first and second gaming system states.

7. The system of claim 1, wherein the stored instructions further enable the processor, when the determined state of the gaming system is the second gaming system state, to transmit a predetermined responsive communication to a source of the received communication indicating delayed response by the player.

8. A method performed by one or more processors, comprising:

determining a state of a gaming system;

receiving, during a gaming session between a player and the gaming system, a communication to be provided to the player;

when the determined state of the gaming system is a first gaming system state, providing the received communication to the player during the gaming session; and when the determined state of the gaming system is a second gaming system state different from the first gaming system state, delaying provision of the received communication to the player during the gaming session until the state of the gaming system is the first gaming system state.

9. The method of claim 8, wherein the state of the gaming system comprises one or more of a characteristic of the gaming session, occurrence of an in-game event during the gaming session, connection of a communication device of the player to the gaming system, wherein the characteristic of the gaming session comprises one or more of speed of play, cash in amount, wager behavior, wagering speed, cash out amount, play session length, additional in-session cash in amounts, and idle time, and wherein the communication comprises one or more of a text communication, a video communication, a pop-up, a gaming system notification, advertisement, announcement, and an information feed.

10. The method of claim 8, wherein the determining, receiving, providing, and delaying are performed by an application executing on a communication device of the player, wherein the communication device is wirelessly connected to the gaming system, and further comprising:

when the determined state of the gaming system is the second gaming system state, caching the communication by the application for later presentation by the communication device to the player.

11. The method of claim 8, wherein the received communication is addressed to a communication device of the player and further comprising:

based on the determined state of the gaming system, selecting a set of presentation parameters for the communication, the set of presentation parameters comprising one or more of identification of a target display on a gaming device of the gaming system and/or the communication device of the player for providing the communication, a presentation frequency for presenting received communications to the player, a display notification object type, size, a display location to notify the player of a number of received communications awaiting presentation to the player, and a time interval during which received communications awaiting presentation to the player are to be cached for later presentation to the player.

12. The method of claim 8, further comprising:

when the determined state of the gaming system is the second gaming system state, to applying a set of filtration rules to determine whether to cache the received communication for delayed presentation to the player after the gaming session or provide the communication to the player during the gaming session.

13. The method of claim 12, wherein the set of filtration rules is based on one or more of the following parameters: a source of the received communication, a type or modality of the received communication, content of the received communication, and a priority of the received communication, and further comprising scanning the received communication for malicious content and, when the received communication comprises malicious content, prevent presentation of the received communication in the first and second gaming system states.

14. The method of claim 8, further comprising:

when the determined state of the gaming system is the second gaming system state, transmitting a predetermined responsive communication to a source of the received communication indicating delayed response by the player.

15. A system comprising:

a communication interface;

a processor coupled with the communication interface; and a non-transitory computer-readable storage medium coupled with the processor, the computer-readable storage medium storing instructions thereon that enable the processor to:

determine a state of a gaming system;

determine a state of a communication device of a player;

receive, during a gaming session between the player and the gaming system, a communication to be provided to the player;

when the determined state of the gaming system is a first gaming system state and the determined state of the communication device is a first communication device state, provide the received communication to the player during the gaming session; and when the determined state of the gaming system is a second gaming system state different from the first gaming system state or the determined state of the communication device is a second communication device state different from the first communication device state, delay providing the received communication to the player during the gaming session until the determined state returns to a corresponding one of second gaming system state and second communication device state.

16. The system of claim 15, wherein the state of the gaming system comprises one or more of a characteristic of the gaming session, occurrence of an in-game event during the gaming session, connection of a communication device of the player to the gaming system, wherein the characteristic of the gaming session comprises one or more of speed of play, cash in amount, wager behavior, wagering speed, cash out amount, play session length, additional in-session cash in amounts, and idle time, wherein the state of the communication device comprises an occurrence of a user interaction event with a user interface of the communication device, and wherein the communication comprises one or more of a text communication, a video communication, a pop-up, a gaming system notification, advertisement, announcement, and an information feed.

17. The system of claim 15, wherein the stored instructions are part of an application executing on a communication device of the player, wherein the communication device is wirelessly connected to the gaming system, wherein the application and the gaming system exchange information regarding the state of the communication device and state of the gaming system, respectively, and wherein, when the determined state of the gaming system is the second gaming system state or the determined state of the communication device is the second communication device state, the communication is cached by the application for later presentation by the communication device to the player.

18. The system of claim 15, wherein the received communication is addressed to the communication device of the player, wherein the determined state is the second gaming system state or the second communication device state, and wherein the stored instructions further enable the processor, based on the determined state, to select a set of presentation parameters for the communication, the set of presentation parameters comprising one or more of identification of a target display on a gaming device of the gaming system and/or the communication device of the player for providing the communication, a presentation frequency for presenting received communications to the player, a display notification object type, size, a display location to notify the player of a number of received communications awaiting presentation to the player, and a time interval during which received communications awaiting presentation to the player are to be cached for later presentation to the player.

19. The system of claim 15, wherein the stored instructions further enable the processor, when the determined state is the second gaming system state or second communication device state, to apply a set of filtration rules to determine whether to cache the received communication for delayed presentation to the player after the gaming session or provide the communication to the player during the gaming session, and wherein the set of filtration rules are based on one or more of the following parameters: a source of the received communication, a type or modality of the received communication, content of the received communication, and a priority of the received communication, and wherein the stored instructions further enable the processor to scan the received communication for malicious content and, when the received communication comprises malicious content, prevent presentation of the received communication in the first and second gaming system states.

20. The system of claim 15, wherein the stored instructions further enable the processor, when the determined state is the second gaming system state or the second communication device state, to transmit a predetermined responsive communication to a source of the received communication indicating delayed response by the player.

* * * * *